(12) United States Patent
Nagai et al.

(10) Patent No.: US 7,628,727 B2
(45) Date of Patent: Dec. 8, 2009

(54) AUTOMATIC SPEED REDUCING RATIO-SWITCHING APPARATUS

(75) Inventors: Shigekazu Nagai, Tokyo (JP); Ryuichi Masui, Bando (JP)

(73) Assignee: SMC Kabushiki Kaisha, Tokyo (JP)

( * ) Notice: Subject to any disclaimer, the term of this patent is extended or adjusted under 35 U.S.C. 154(b) by 484 days.

(21) Appl. No.: 11/627,753

(22) Filed: Jan. 26, 2007

(65) Prior Publication Data
US 2007/0191177 A1    Aug. 16, 2007

(30) Foreign Application Priority Data
Feb. 16, 2006  (JP) .............................. 2006-039780

(51) Int. Cl.
F16H 3/44 (2006.01)
F16H 48/26 (2006.01)
F16H 57/08 (2006.01)

(52) U.S. Cl. .................... 475/291; 475/87; 475/339; 475/341; 475/292; 475/294

(58) Field of Classification Search .................. 475/85, 475/87, 89, 91, 340, 341, 339, 342, 290, 475/291, 292, 294, 297, 903
See application file for complete search history.

(56) References Cited

U.S. PATENT DOCUMENTS

| | | | |
|---|---|---|---|
| 3,164,034 A | 1/1965 | Kelley | |
| 4,472,984 A * | 9/1984 | Cook | 475/35 |
| 4,852,707 A | 8/1989 | Ito et al. | |
| 4,869,139 A | 9/1989 | Gotman | |
| 5,041,748 A | 8/1991 | Huber | |
| 5,730,232 A | 3/1998 | Mixer | |
| 5,730,494 A | 3/1998 | LaPointe et al. | |
| 5,813,666 A | 9/1998 | Berchtold | |
| 5,855,530 A * | 1/1999 | Huang et al. | 475/289 |
| 6,409,622 B1 * | 6/2002 | Bolz et al. | 475/5 |
| 6,652,410 B2 * | 11/2003 | Gutierrez Vesga | 475/290 |
| 6,806,602 B2 | 10/2004 | Hilzinger et al. | |
| 2004/0071563 A1 | 4/2004 | Nagai et al. | |
| 2004/0104554 A1 | 6/2004 | Watwood et al. | |
| 2005/0022523 A1 | 2/2005 | Nagai et al. | |
| 2005/0087068 A1 | 4/2005 | Nagai et al. | |

(Continued)

FOREIGN PATENT DOCUMENTS

JP          64-69829          3/1989

(Continued)

*Primary Examiner*—Roger Pang
(74) *Attorney, Agent, or Firm*—Paul A. Guss

(57) ABSTRACT

An automatic speed reducing ratio-switching apparatus comprising an input side carrier, an output side carrier, and an intermediate carrier includes first and second planetary gear mechanisms juxtaposed in the axial direction of an input shaft, first and second inner clutch members which are rotatable in one direction while locking rotation in the other direction of the input shaft, and have mutually different locking directions, first and second outer clutch members which are rotatable in one direction while locking rotation in the other direction of the input side or output side ring gear, and have mutually different locking directions, and a viscous resistance member functioning under a static frictional force to integrally rotate the input side or output side sun gear, the input side or output side planet gears, and the input side or output side ring gears respectively in an identical direction.

11 Claims, 40 Drawing Sheets

U.S. PATENT DOCUMENTS

2005/0272548 A1  12/2005  Nagai et al.

FOREIGN PATENT DOCUMENTS

| | | |
|---|---|---|
| JP | 0571593 A * | 3/1993 |
| JP | 2002-266902 | 9/2002 |
| JP | 2003-184982 | 7/2003 |
| JP | 2005-133379 | 5/2005 |
| JP | 2006-22950 | 1/2006 |
| KR | 10-2006-0056148 | 5/2006 |

* cited by examiner

MOTOR CHARACTERISTIC

MOTOR CHARACTERISTIC

COMPLETE VISCOUS
CHARACTERISTIC

STATIC FRICTION
+
VISCOUS CHARACTERISTIC

RESISTANCE CHARACTERISTIC
(TORQUE LIMIT TYPE)

$$\frac{1}{4} \cdot \frac{1}{3} = \frac{1}{12} \sim \frac{1}{4} \cdot \frac{1}{1} = \frac{1}{4}$$

$$\frac{1}{4} \cdot \frac{1}{3} = \frac{1}{12} \sim \frac{1}{4} \cdot \frac{1}{1} = \frac{1}{4}$$

$$\frac{1}{4} \cdot \frac{1}{4} \cdot \frac{1}{3} \sim \frac{1}{4} \cdot \frac{1}{4} \cdot \frac{1}{1}$$
$$= \frac{1}{48} \sim \frac{1}{16}$$

$$\frac{1}{3} \cdot \frac{1}{3} \sim \frac{1}{3} \cdot \frac{1}{1} \sim \frac{1}{1} \cdot \frac{1}{1}$$
$$= \frac{1}{9} \sim \frac{1}{3} \sim \frac{1}{1}$$

AUTOMATIC SPEED REDUCING RATIO-SWITCHING APPARATUS

BACKGROUND OF THE INVENTION

Field of the Invention:

The present invention relates to an automatic speed reducing ratio-switching apparatus capable of automatically switching a speed reducing ratio transmitted from an output shaft, for example, to another member or apparatus through means of a planetary gear mechanism, when a load in excess of a predetermined torque is applied thereto. The present invention can be applied and utilized in a variety of extensive fields, to be described later on.

Description of the Related Art:

A speed reducing ratio-switching mechanism has been hitherto applied, for example, to machine systems such as construction machines. In such machine systems, an electric cylinder is used as an actuator in an expansion/contraction operation system, for driving a link mechanism.

In such an electric cylinder, a rotary shaft is connected to an input portion of an electric motor housed within a casing, and a screw shaft is arranged in connection with the rotary shaft. The screw shaft is screw-engaged with a nut member, which is rotatably supported inside the casing. Two pairs of planetary gear mechanisms, which have different speed reducing ratios, are provided between the rotary shaft and the nut member. Each of the planetary gear mechanisms comprises a sun gear, and planet gears, which are meshed with the sun gear and an internal gear provided inside of the cylindrical casing, so as to undergo planetary motion. The sun gears of each of the planetary gear mechanisms are connected to the rotary shaft via a one-way clutch, wherein the direction of engagement is different with respect to the forward rotation direction and the reverse rotation direction thereof. A planetary support shaft, which rotatably supports the planet gears of each of the planetary gear mechanisms, is connected to the nut member.

In the case of an electric cylinder, when the electric motor is driven and rotated in the forward rotation direction, then the rotary shaft is also rotated in the forward rotation direction, and the nut member is rotated in the forward rotation direction through the planetary gear mechanism at a small speed reducing ratio, whereby the screw shaft is operated and moved in an expandable manner. On the other hand, when the electric motor is driven and rotated in the reverse rotation direction, then the rotary shaft is also rotated in the reverse rotation direction, and the nut member is rotated in the reverse rotation direction through the planetary gear mechanism at a large speed reducing ratio, whereby the screw shaft is operated and moved in a contractible manner (see Japanese Laid-Open Patent Publication No. 2003-184982).

However, in the case of the aforementioned electric cylinder, it is necessary to use two types of planetary gear mechanisms, each having different speed reducing ratios, in order for the screw shaft to perform both an expanding operation and a contracting operation. In this case, the number of parts is increased, and the entire electric cylinder is increased in size.

In the case of the planetary gear mechanisms of the electric cylinder described above, the expanding operation is performed at a low speed and with a large thrust force, while the contracting operation is performed at a high speed with a small thrust force, irrespective of the magnitude of the load torque that is applied to the electric cylinder. Therefore, the movement speed of the screw shaft cannot be increased to a higher speed during the expanding operation, even if the load torque applied to the electric cylinder is small.

In view of the above, the present applicant has suggested an automatic speed reducing ratio-switching apparatus, which makes it possible to control torque and transmit the torque at a high speed, by automatically switching the speed reducing ratio in response to operation of a displacement member that forms an actuator (see, Japanese Patent Application No. 2005-141123).

SUMMARY OF THE INVENTION

A general object of the present invention is to provide an automatic speed reducing ratio-switching apparatus, which makes it possible to smoothly transmit torque to an output side, by controlling the torque even when a large torque is applied to the input side.

According to the present invention, when a rotary driving force is applied in one direction from an input shaft under a driving action of a rotary driving source, then a first inner clutch member, which has a mutually different locking direction, is placed in a free state so that a first planetary gear mechanism is not operated, a second inner clutch member is placed in a locked state, and the rotary driving force is applied in the one direction to a second planetary gear mechanism.

In this situation, the load (for example, a load to be applied to the output shaft on account of a deenergized and stopped state of a driven apparatus that is connected to the output shaft), which overcomes viscous resistance, is applied beforehand to an output side ring gear in the second planetary gear mechanism. The output side ring gear is rotated in another direction, which is opposite to the one direction, and thus locking is effected by a second outer clutch member. As a result, the second planetary gear mechanism is decelerated, and a high torque is transmitted to the output shaft.

When the load on the side of the output shaft is decreased and the viscous resistance overcomes the load after the second planetary gear mechanism is decelerated, then the output side sun gear, the output side planet gears, and the output side ring gear revolve together in an integrated manner and in an identical direction, respectively, owing to the action of a static frictional force of a viscous resistance member. When the load (i.e., the external load applied to the driven apparatus) is applied to the output shaft via the driven apparatus, in the state in which the output side sun gear, the output side planet gears, and the output side ring gear revolve integrally as described above, then a shift down is effected so as to decrease the speed, and the high torque is transmitted to the output shaft.

On the other hand, when the rotary driving force is applied to the input shaft in the other direction, under a switching action of the rotary driving source reverse to that described above, then the second inner clutch member, having a mutually different locking direction, is placed in a free state so that the second planetary gear mechanism is not operated, the first inner clutch member is placed in a locked state, and the rotary driving force is applied in the other direction to the first planetary gear mechanism.

In this situation, a load, which overcomes the viscous resistance, is applied to an input side ring gear in the first planetary gear mechanism. The input side ring gear is rotated in one direction, which is opposite to the other direction, and thus locking is effected by a first outer clutch member. As a result, the first planetary gear mechanism is decelerated, and a high torque is transmitted to the output shaft.

When the load on the side of the output shaft is decreased and the viscous resistance overcomes the load after the first planetary gear mechanism is decelerated, then an input side sun gear, input side planet gears, and the input side ring gear revolve together in an integrated manner and in an identical direction, respectively, owing to the action of a static frictional force of the viscous resistance member. When the load is applied to the output shaft via the driven apparatus, in a state in which the input side sun gear, the input side planet gears, and the input side ring gear revolve integrally as described above, then a shift down is effected so as to decrease the speed, and the high torque is transmitted to the output shaft.

In the present invention, as described above, the first planetary gear mechanism and the second planetary gear mechanism, which are juxtaposed in the axial direction of the input shaft, are operated such that either one of them may be appropriately switched and operated in response to the direction of rotation applied to the input shaft. Accordingly, even when a large torque is applied to the input side, torque can smoothly be transmitted to the output shaft side without requiring use of a large gear, for example.

As a result, in the present invention, even when a large torque is applied to the input side, the torque can be appropriately controlled and smoothly transmitted to the output side.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
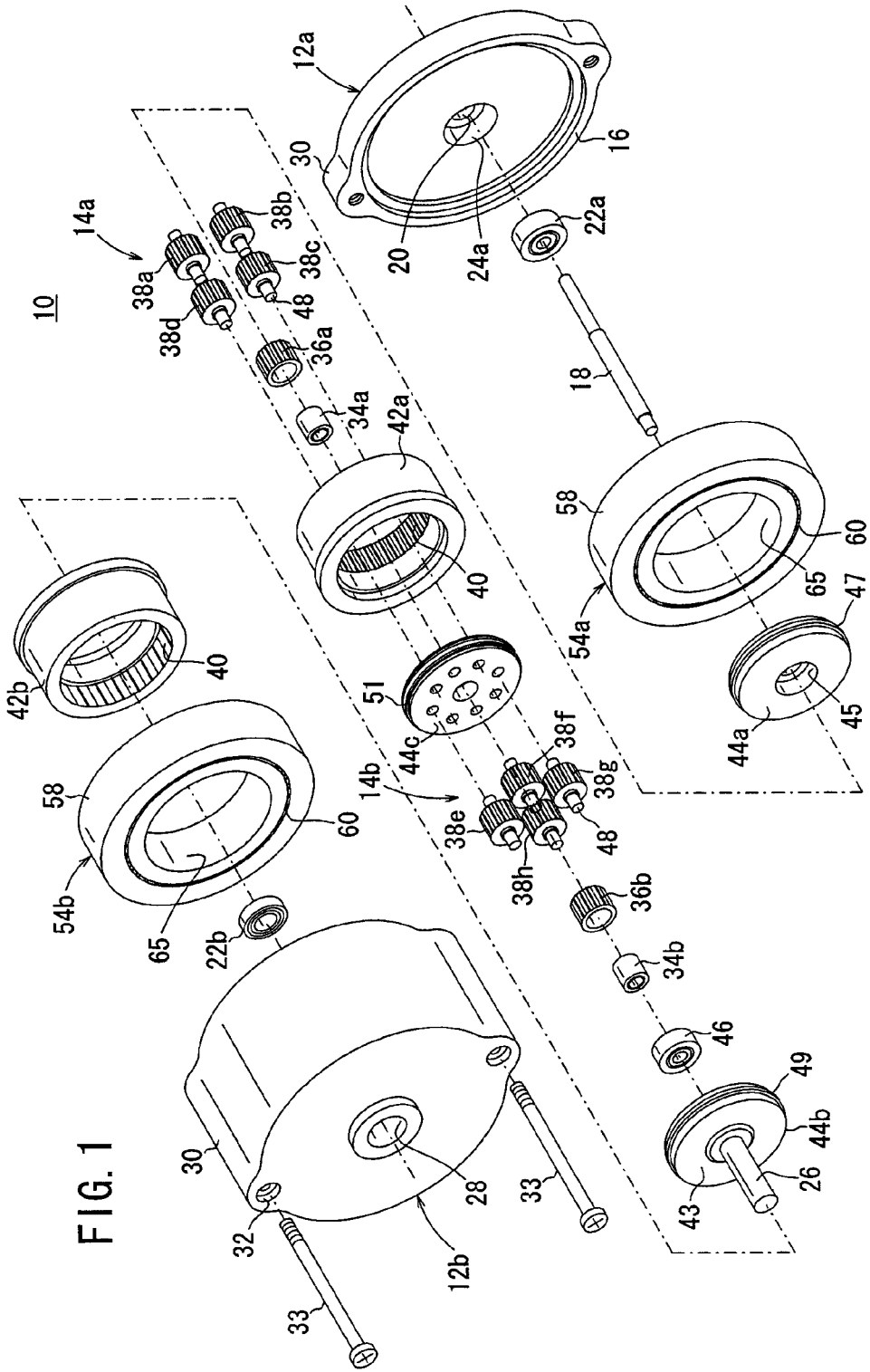
FIG. 1 is an exploded perspective view illustrating an automatic speed reducing ratio-switching apparatus according to an embodiment of the present invention.
Figure 3:
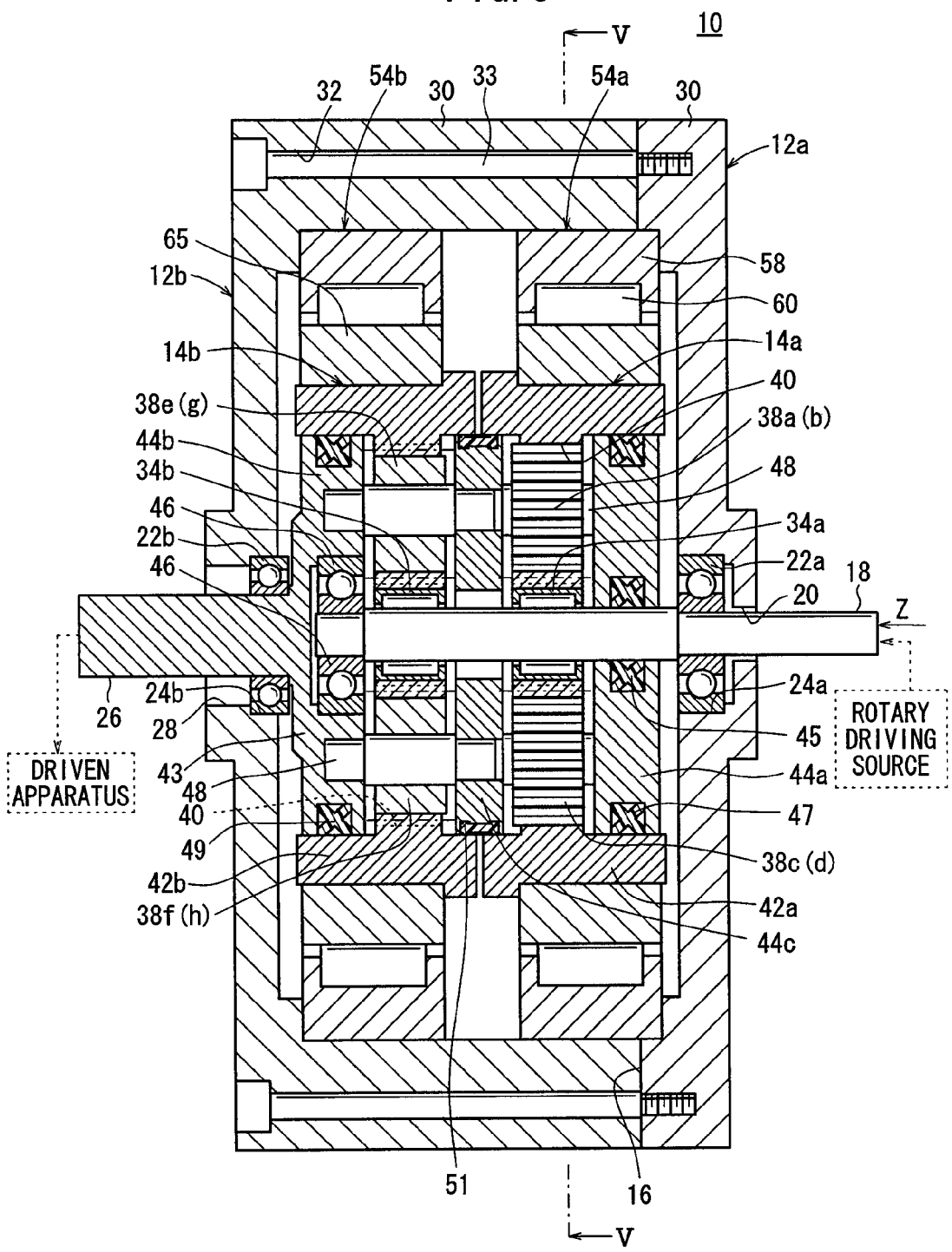
FIG. 3 is a longitudinal sectional view taken in the axial direction illustrating the automatic speed reducing ratio-switching apparatus shown in FIG. 1.

FIG. 1 shows an exploded perspective view illustrating an automatic speed reducing ratio-switching apparatus according to an embodiment of the present invention. FIG. 3 shows a longitudinal sectional view taken in the axial direction illustrating the automatic speed reducing ratio-switching apparatus.

As shown in FIGS. 1 and 3, the automatic speed reducing ratio-switching apparatus 10 according to the embodiment of the present invention comprises housings 12a, 12b, which are divided into two parts, and a first planetary gear mechanism 14a and a second planetary gear mechanism 14b, which are juxtaposed in the axial direction within a chamber that is tightly sealed by the housings 12a, 12b.

The housing 12a has a disk section, which is integrally formed with a circular flange section 16. A circular hole 20, into which an input shaft 18 is inserted while leaving a portion of the input shaft 18 exposed to the outside, is formed at a central portion of the disk section. An annular recess 24a, in which a bearing section 22a is fastened so as to rotatably support the input shaft 18, is provided on the inner wall of the housing 12a.

The housing 12b is composed of a bottom-equipped cylindrical member. An opening of the bottom-equipped cylindrical member is closed by the housing 12a. A circular hole 28, into which an output shaft 26 is inserted while leaving a portion of the output shaft 26 exposed to the outside, is formed at a central portion of the bottom of the bottom-equipped cylindrical member. An annular recess 24b, in which a bearing section 22b is installed so as to rotatably support the output shaft 26, is provided on the inner wall of the housing 12b disposed closely to the hole 28.

A pair of expanded sections 30, having circular arc-shaped cross sections which protrude from the outer circumferential surface in a diametrical direction, are provided for each of the housings 12a, 12b. An attachment hole 32 that penetrates in an axial direction is formed through the expanded section 30. Rods 33 are inserted respectively into the pair of attachment holes 32, so that the rods 33 are fitted into screw sections. Accordingly, the housings 12a and 12b, which are composed of two parts, are connected to one another in an integrated manner.

The first planetary gear mechanism 14a and the second planetary gear mechanism 14b, which are juxtaposed substantially in parallel to the input shaft 18, are composed of substantially identical constitutive members.

The first planetary gear mechanism 14a includes an input side sun gear 36a, which is connected to the input shaft 18 via a first inner clutch member 34a (hereinafter referred to as an "inner OWL 34a"), four input side planet gears 38a, 38b, 38c, 38d, which are meshed with the input side sun gear 36a while being separated from each other by angles of about 90 degrees in the circumferential direction of the input side sun gear 36a, thus enabling the input side planet gears 38a, 38b, 38c, 38d to both revolve and rotate, an input side ring gear 42a having a gear section 40 provided on an inner circumferential surface thereof in meshed engagement with the input side planet gears 38a, 38b, 38c, 38d, and a disk-shaped input side carrier 44a.

As shown in FIG. 3, a first seal member 45, composed of a small diameter ring member and having an X-shaped cross section positioned so as to surround the outer circumferential surface of the input shaft 18, is installed in an annular groove on the inner circumferential surface of the hole of the input side carrier 44a. As a result of the first seal member 45, it is possible to avoid external leakage of the viscous fluid, such as an oil or grease as described later on, which might otherwise be caused by the input shaft 18. A second seal member 47, which is composed of a large diameter ring member having an X-shaped cross section, and which functions as a seal by making contact with the inner circumferential surface of the input side ring gear 42a, is installed in an annular groove on the outer circumferential surface of the input side carrier 44a.

The second planetary gear mechanism 14b includes an output side sun gear 36b, which is connected to the input shaft 18 via a second inner clutch member 34b (hereinafter referred to as an "inner OWR 34b"), four output side planet gears 38e, 38f, 38g, 38h, which are meshed with the output side sun gear 36b while being separated from each other by angles of about 90 degrees in the circumferential direction of the output side sun gear 36b, thus enabling output side planet gears 38e, 38f, 38g, 38h to both revolve and rotate, an output side ring gear 42b having a gear section 40 provided on the inner circumferential surface thereof in meshed engagement with the output side planet gears 38e, 38f, 38g, 38h, and an output side carrier 44b having a disk-shaped disk section 43, wherein the output shaft 26 is formed integrally at a central portion of the disk section 43.

A third seal member 49 composed of a large diameter ring member having an X-shaped cross section, which functions as a seal by making contact with the inner circumferential surface of the output side ring gear 42b, is installed in an annular groove on the outer circumferential surface of the output side carrier 44b.

With this arrangement, as shown in FIG. 3, the input shaft 18 and the output shaft 26 are disposed coaxially. The output shaft 26 is rotatably supported by a bearing member 46, which is fastened to the inner wall of the housing 12b.

The input side carrier 44a and the output side carrier 44b extend in parallel to one another in a direction substantially perpendicular to the axis of the input shaft 18, and are separated from each other by a predetermined distance along the input shaft 18. A substantially disk-shaped intermediate carrier 44c is disposed between the input side carrier 44a and the output side carrier 44b (see FIG. 2).

With this arrangement, the intermediate carrier 44c extends in a direction substantially perpendicular to the axis of the input shaft 18 in the same manner as the input side carrier 44a and the output side carrier 44b. Further, the input side carrier 44a, the output side carrier 44b, and the intermediate carrier 44c extend substantially in parallel to one another.

Figure 4:
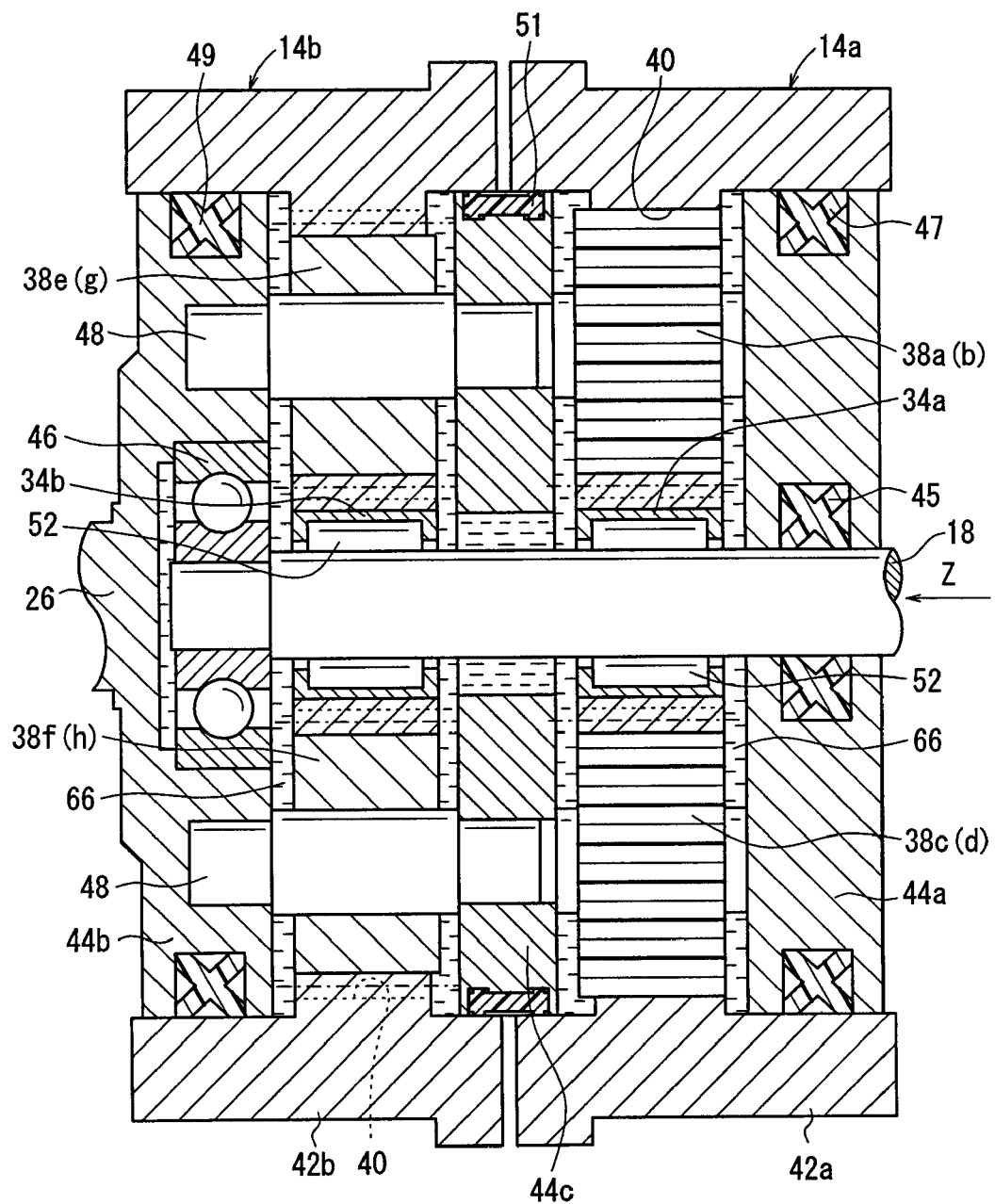
FIG. 4 is a partial magnified longitudinal sectional view illustrating features shown in FIG. 3.

A fourth seal member 51, which functions as a seal by making contact with inner walls of the input side ring gear 42a and the output side ring gear 42b respectively, is installed on the outer circumferential surface of the intermediate carrier 44c. The fourth seal member 51 is formed integrally with a large diameter ring member. A pair of lips, which expand in a circular arc-shaped form, contact the inner circumferential surfaces of the input side ring gear 42a and the output side ring gear 42b, respectively, in order to effect a sealing function (see FIG. 4).

The four input side planet gears 38a, 38b, 38c, 38d that constitute the first planetary gear mechanism 14a are axially attached rotatably between the input side carrier 44a and the intermediate carrier 44c through the use of respective pins 48. On the other hand, the four output side planet gears 38e, 38f, 38g, 38h that constitute the second planetary gear mechanism 14b are axially attached rotatably between the output side carrier 44b and the intermediate carrier 44c through the use of respective pins 48.

Therefore, the input side carrier 44a, the output side carrier 44b, and the intermediate carrier 44c, which are axially attached substantially in parallel to one another by pins 48, are disposed so as to be rotated integrally in response to the direction of rotation of the input shaft 18 about the axial center of the input shaft 18, respectively.

Figure 2:
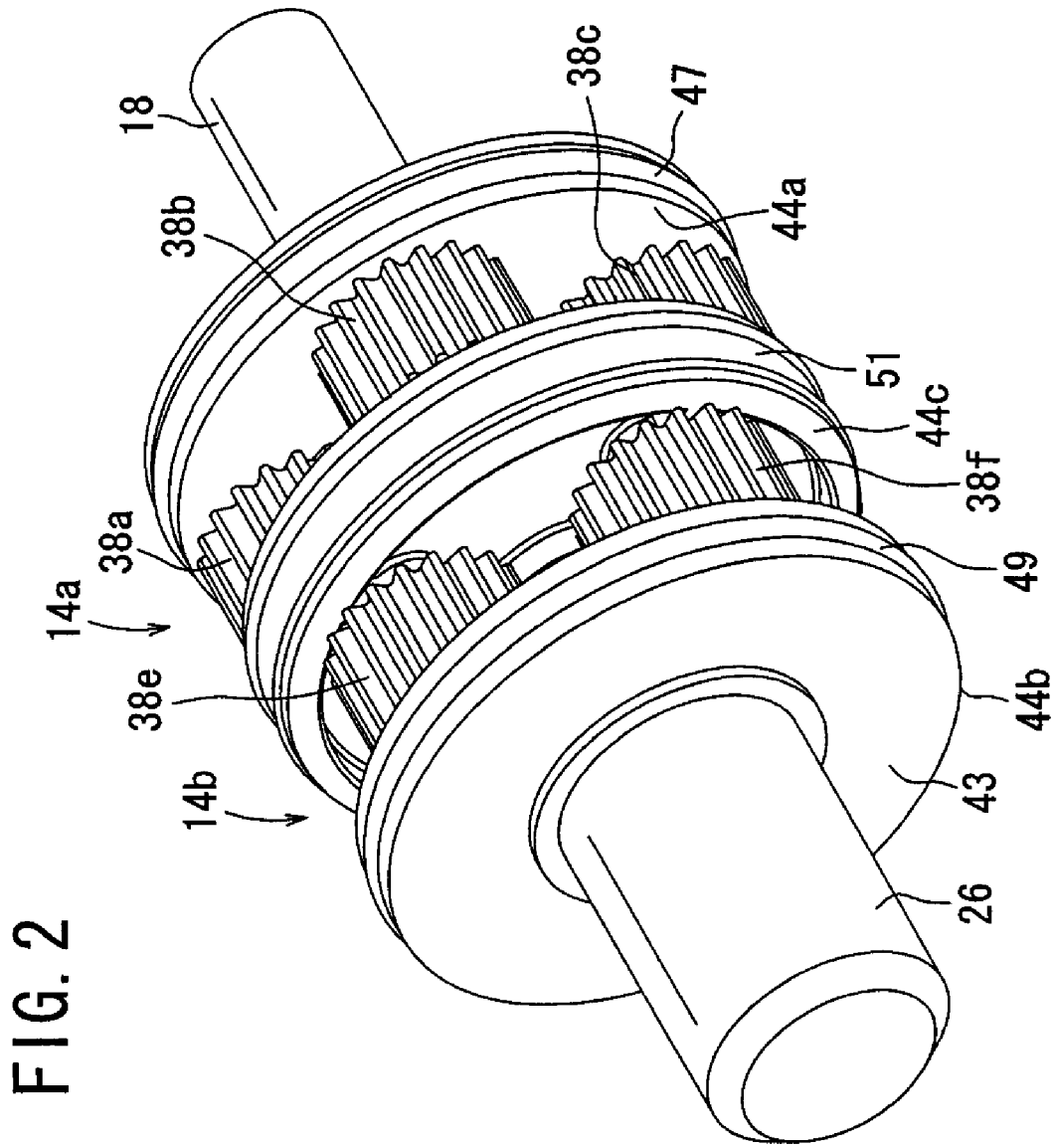
FIG. 2 is a partial magnified perspective view illustrating a state in which a first planetary gear mechanism and a second planetary gear mechanism are juxtaposed to make up the automatic speed reducing ratio-switching apparatus shown in FIG. 1.
Figure 5:
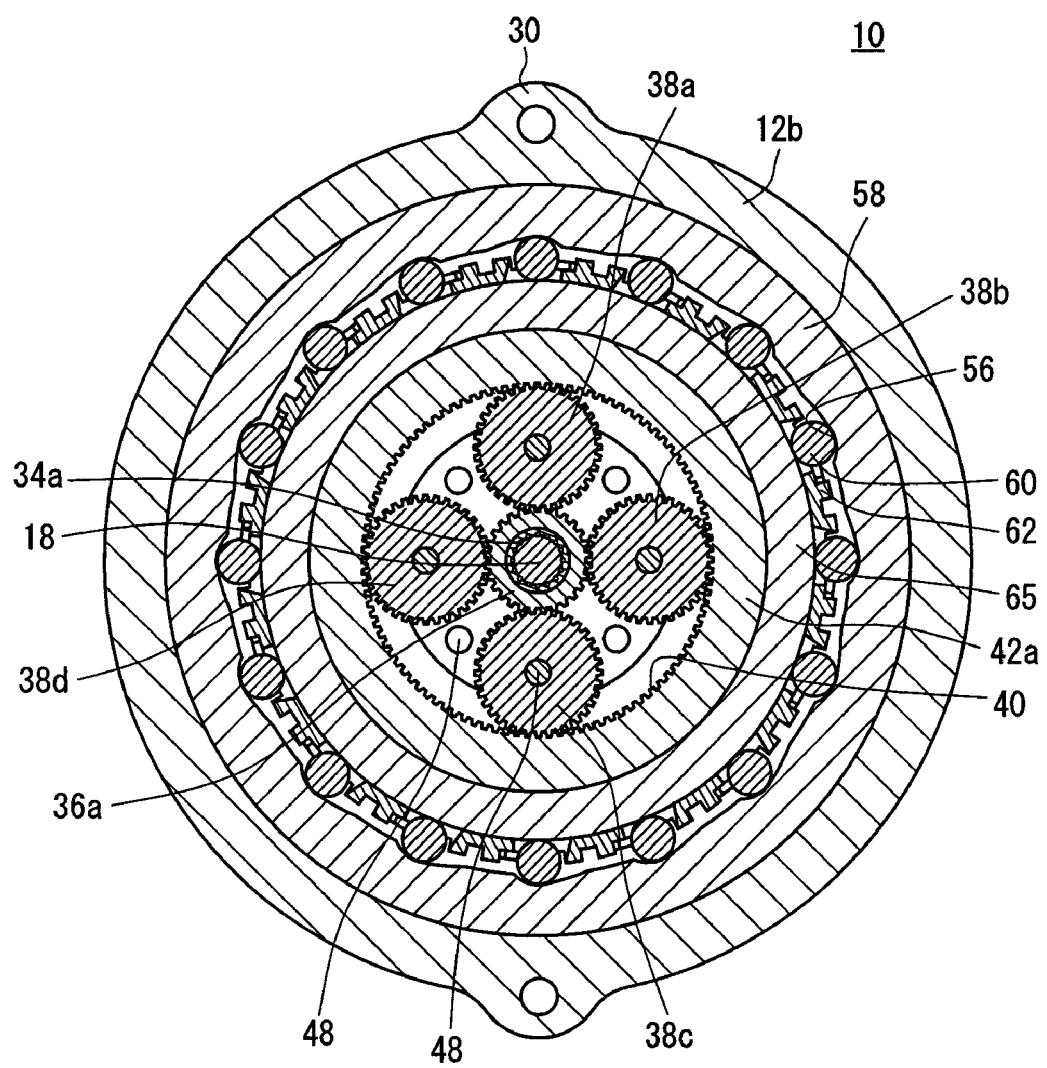
FIG. 5 is a vertical sectional view taken along line V-V shown in FIG. 3.

As shown in FIGS. 2 and 5, the input side planet gears 38a, 38b, 38c, 38d provided on one side surface of the intermediate carrier 44c, and the output side planet gears 38e, 38f, 38g, 38h provided on the other side surface of the intermediate carrier 44c and disposed in opposition to the one side surface, are arranged respectively so that their phases are deviated from each other by about 45 degrees in the circumferential direction.

The input side ring gear 42a, which has an intermediate diameter, is fitted on an outer circumferential side of the input side planet gears 38a, 38b, 38c, 38d. The input side planet gears 38a, 38b, 38c, 38d are meshed in engagement with the gear section 40, which is engraved on the inner circumference of the input side ring gear 42a. On the other hand, the output side ring gear 42b, which has an intermediate diameter, is fitted on an outer circumferential side of the output side planet gears 38e, 38f, 38g, 38h. The output side planet gears 38e, 38f, 38g, 38h are meshed in engagement with the gear section 40 that is engraved on the inner circumference of the output side ring gear 42b.

The inner OWL 34a, which is interposed between the input shaft 18 and the input side sun gear 36a, and the inner OWR 34b, which is interposed between the input shaft 18 and the output side sun gear 36b, are each constructed, for example, by a well-known one-way clutch, which permits rotation only in one direction, and which stops rotation in the other opposite direction so as to effect locking.

Figure 8:
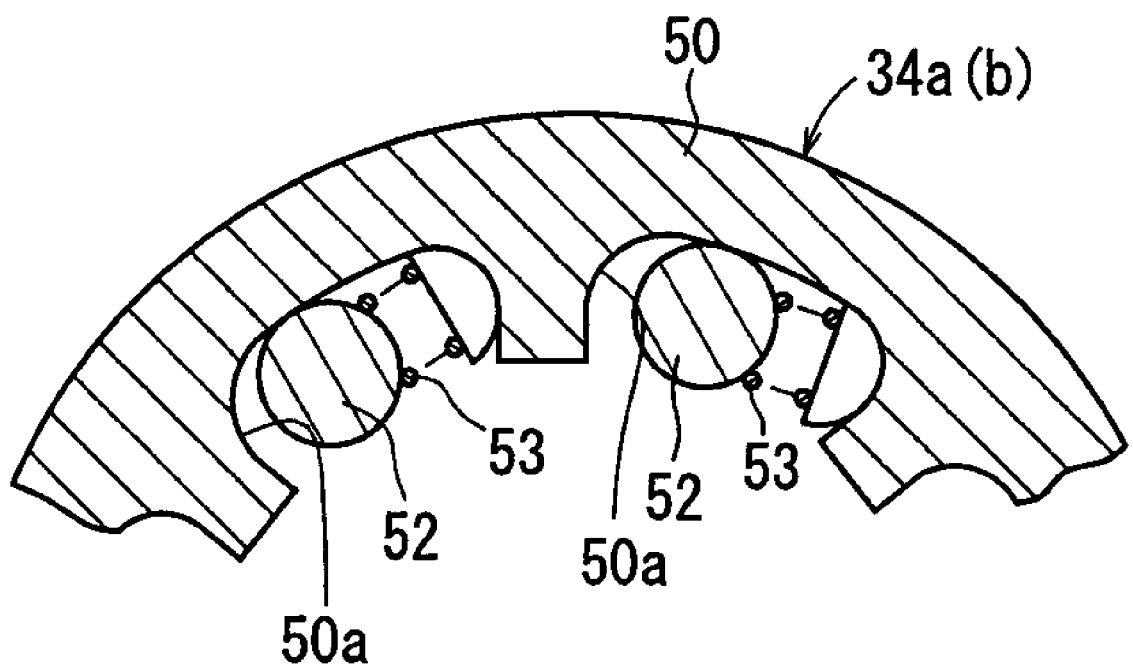
FIG. 8 is a vertical sectional view illustrating a free state of first and second inner clutch members, which are interposed between an input shaft and respective input side and output side sun gears.
Figure 9:
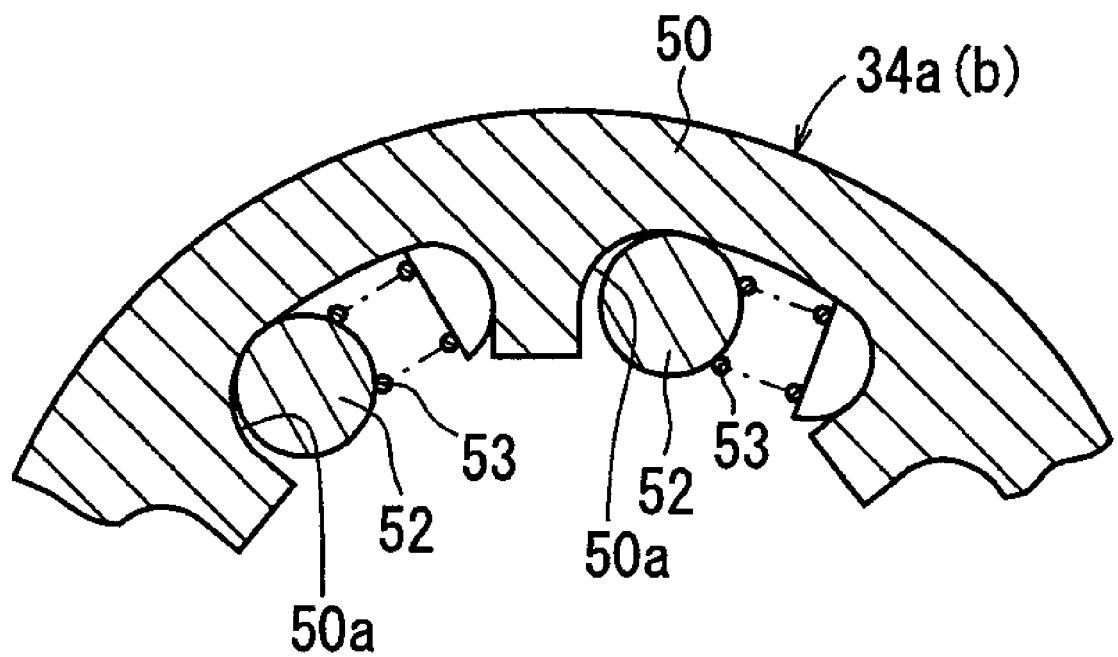
FIG. 9 is a vertical sectional view illustrating a locked state in which needle bearings making up the first and second inner clutch members engage with grooves.

As shown in FIGS. 8 and 9, the inner OWL 34a and the inner OWR 34b are each composed of a cylindrical member 50, which is externally fitted over the outer circumferential surface of the input shaft 18, along with a plurality of needle bearings 52, which are retained in grooves formed on the inner circumferential surface of the cylindrical member 50.

Grooves 50a, each of which has a circular arc-shaped cross section to retain the individual needle bearings 52, are formed on the inner circumferential surface of the cylindrical member 50. When the needle bearings 52 are fastened in the grooves 50a having the circular arc-shaped cross section, the cylindrical member 50, which is externally fitted to the input shaft 18, is placed in a locked state (see FIG. 8), i.e., a state in which the cylindrical member 50 is fixed with respect to the input shaft 18. Springs 53, such as plate springs, which press against the individual needle bearings 52, are provided in the grooves 50a.

In this arrangement, the inner OWL 34a, to which the input side sun gear 36a is externally fitted, is set so that rotation of the input shaft 18 only in a leftward direction is permitted, whereas the input shaft 18 becomes locked when rotated in the rightward direction. On the other hand, the inner OWR 34b, to which the output side sun gear 36b is externally fitted, is set so that only rotation of the input shaft 18 in the rightward direction is permitted, whereas the input shaft 18 becomes locked when rotated in the leftward direction. In other words, the inner OWL 34a and the inner OWR 34b are set such that the directions (locking direction) thereof, in which rotation is permitted for the input shaft 18, are opposite to one another.

A first outer clutch member 54a (hereinafter referred to as an "outer OWR 54a"), which has a large diameter, is fitted on an outer circumferential side of the input side ring gear 42a. The input side ring gear 42a is locked by the outer OWR 54a in response to the direction of rotation of the input side ring gear 42a. On the other hand, a second outer clutch member 54b (hereinafter referred to as an "outer OWL 54b"), which has a large diameter, is fitted on the outer circumferential side of the output side ring gear 42b. The output side ring gear 42b is locked by the outer OWL 54b in response to the direction of rotation of the output side ring gear 42b.

In this arrangement, the outer OWR 54a and the outer OWL 54b are each constructed by a one-way clutch, which permits rotation only in one direction, and stops rotation in the other direction opposite thereto, so as to effect locking.

Figure 6:
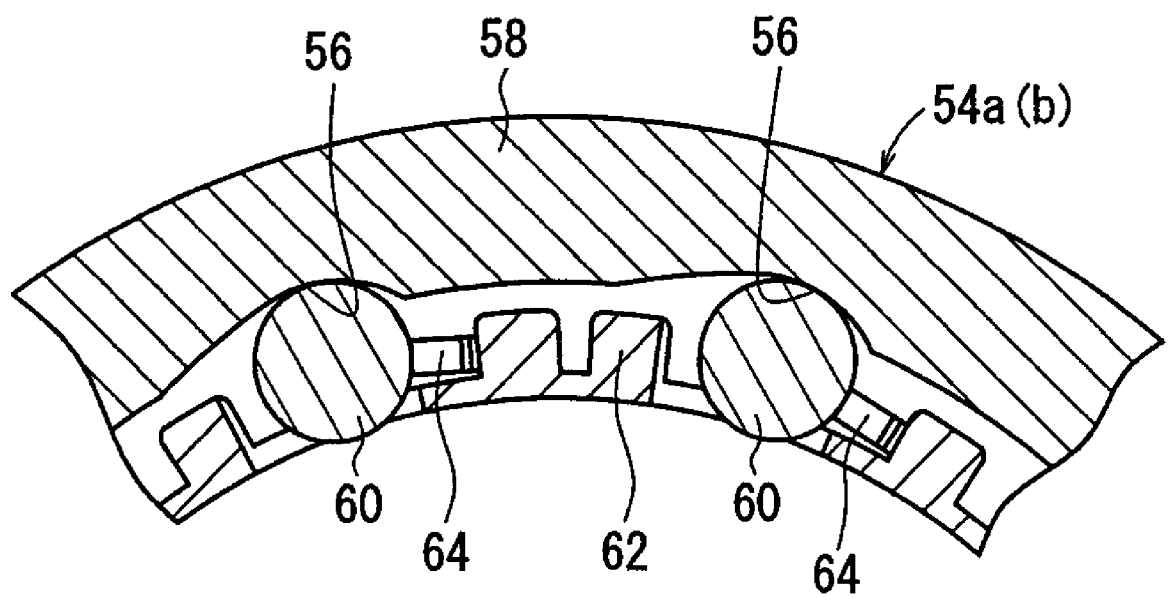
FIG. 6 is a vertical sectional view illustrating a free state of first and second outer clutch members, which are provided at outer circumferences of input side and output side ring gears.
Figure 7:
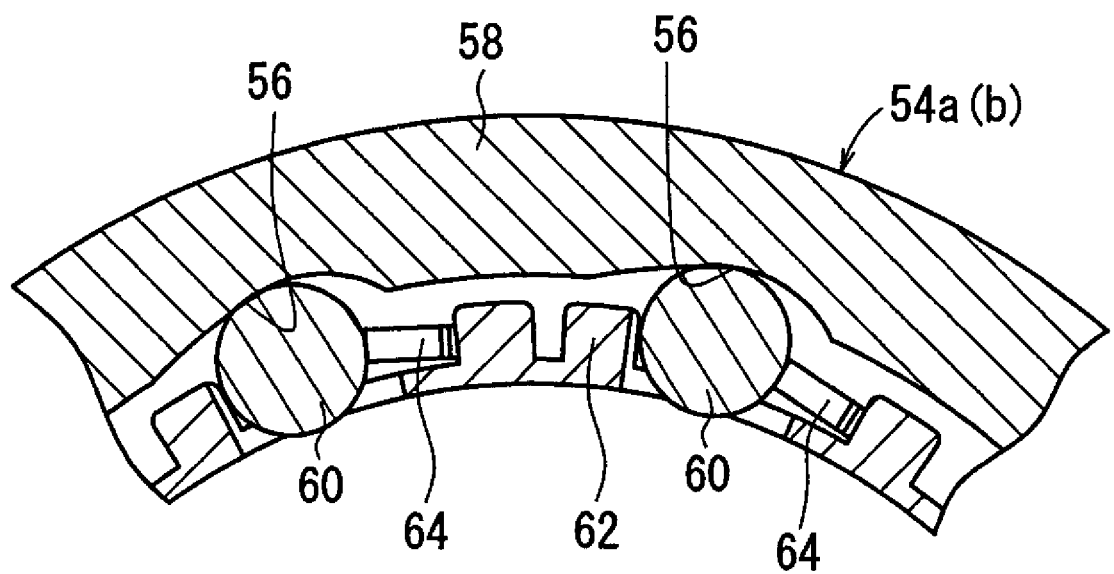
FIG. 7 is a vertical sectional view illustrating a locked state in which roller bearings making up the first and second outer clutch members engage with grooves.

As shown in FIGS. 6 and 7, the outer OWR 54a and the outer OWL 54b each is composed of an outer ring member 58, which is externally fitted to the outer circumferential surface of the input side ring gear 42a or the output side ring gear 42b, with annular brims disposed on both sides thereof and a plurality of grooves 56 having circular arc-shaped cross sections formed in the circumferential direction of the inner circumferential surface. Each of the outer OWR 54a and the outer OWL 54b also includes roller bearings 60, which are composed of a plurality of columnar members retained in the grooves 56 formed for the outer ring member 58, retainers 62 that retain the roller bearings 60, plate springs 64 that press the roller bearings 60 toward the grooves 56 by means of a spring force, and an inner ring member 65 (see FIG. 1), which rotatably retains the plurality of roller bearings 60.

In this arrangement, a gap exists within the space of the first planetary gear mechanism 14a that is sealed (tightly closed) by the first seal member 45, the second seal member 47, and the fourth seal member 51, wherein the gap includes the input side planet gears 38a, 38b, 38c, 38d and the input side sun gear 36a, and further is closed by the input side carrier 44a, the intermediate carrier 44c, and the input side ring gear 42a. The gap is filled with a viscous fluid 66 (hereinafter also referred to as "viscous resistance member 66", if necessary) such as oil or grease, having a predetermined viscosity and functioning as a viscous coupling for obtaining a given viscous resistance (see FIG. 4).

Similarly to the above, a gap exists within the space of the second planetary gear mechanism 14b that is sealed (tightly closed) by the third seal member 49 and the fourth seal member 51, wherein the gap includes the output side planet gears 38e, 38f, 38g, 38h and the output side sun gear 36b, and further is closed by the output side carrier 44b, the intermediate carrier 44c, and the output side ring gear 42b. The gap is filled with a viscous fluid (viscous resistance member) 66 such as oil or grease, having a predetermined viscosity and functioning as a viscous coupling for obtaining a given viscous resistance (see FIG. 4).

The automatic speed reducing ratio-switching apparatus 10 according to the embodiment of the present invention is basically constructed as described above. Next, its operation, functions and effects shall be explained.

At first, for example, a rotary driving source such as a motor is energized in order to transmit a rotary driving force of the rotary driving source to the input shaft 18. It shall be assumed that the rotary driving force rotates the input shaft 18 in a counterclockwise direction (leftward rotation direction), as viewed in the direction from the input shaft 18 to the output shaft 26 (i.e., in the direction of the arrow Z shown in FIG. 3). It shall further be assumed that the output shaft 26 is connected to a driven apparatus, such as an actuator in the operationally stopped state, wherein a low load is previously applied thereto.

When the rotary driving force in the counterclockwise direction is transmitted to the input shaft 18, the inner OWL 34a is placed in a free state, because the inner OWL 34a is previously set so that rotation in the counterclockwise direction is permitted. The first planetary gear mechanism 14a makes no operation at all. Further, a locked state (i.e., a state in which the input shaft 18 and the output side sun gear 36b are fixed) is provided by the inner OWR 34b, which is previously set so as to lock rotation in the counterclockwise direction.

The inner OWR 34b, which constitutes the second planetary gear mechanism 14b, is placed in a locked state. A rotary driving force in the counterclockwise direction is transmitted to the output side sun gear 36b and to the four output side planet gears 38e, 38f, 38g, 38h. Further, a rotary driving force is transmitted to the output side ring gear 42b which is meshed with the output side planet gears 38e, 38f, 38g, 38h.

That is, the output side sun gear 36b, which is locked by the inner OWR 34b, is rotated in a counterclockwise direction. Accordingly, the output side planet gears 38e, 38f, 38g, 38h rotate in the clockwise direction, in a direction opposite to that of the output side sun gear 36b, without undergoing revolution. The output side ring gear 42b, which is meshed with the four output side planet gears 38e, 38f, 38g, 38h, intends to rotate in the clockwise direction, while overcoming the viscous resistance of the viscous fluid 66.

During this situation, a rotary driving force in the clockwise direction (rightward rotation direction) is generated on the output side ring gear 42b. However, a locked state is given, in which rotation of the output side ring gear 42b is stopped by the outer OWL 54b, which has been previously set so as to lock rotation in the clockwise direction.

A shift down state is given at the moment that the locked state is given, in which rotation of the output side ring gear 42b is prohibited. In the fixed state, in which rotation of the output side ring gear 42b is stopped, a shift down state is given in which the output side sun gear 36b is rotated in the counterclockwise direction, and the four output side planet gears 38e, 38f, 38g, 38h rotate respectively in the clockwise direction, opposite to that of the output side sun gear 36b.

The input side sun gear 36a and the input side planet gears 38a, 38b, 38c, 38d, which constitute the first planetary gear mechanism 14a, are connected integrally by means of the intermediate carrier 44c. Therefore, rotation in the counterclockwise direction is effected integrally with the second planetary gear mechanism 14b subjected to the shift down, while the inner OWL 34a is retained in a free state.

After shift down, for example, when the driven apparatus connected to the output shaft 26 is operated, the load applied to the side of the output shaft 26 is gradually decreased, and the viscous resistance of the viscous fluid 66 overcomes the load. Then, the static frictional force is exerted by viscous resistance of the viscous fluid 66 applied between the output side sun gear 36b, the output side planet gears 38e, 38f, 38g, 38h, and the output side ring gear 42b, whereby the output side sun gear 36b, the output side planet gears 38e, 38f, 38g, 38h, the output side ring gear 42b, and the output side carrier 44b start to be rotated in the counterclockwise direction integrally with the input shaft 18. As a result, the locked state that was affected by the outer OWL 54b is released, and the output side ring gear 42b starts rotating in the counterclockwise direction in the same manner as the input shaft 18.

That is, when the driven apparatus begins operation starting from an operationally stopped state, and the load applied to the output shaft 26 is gradually decreased, then a state is given in which the static frictional force generated by viscous resistance of the viscous fluid 66 applied between the output side sun gear 36b, the output side planet gears 38e, 38f, 38g, 38h, and the output side ring gear 42b overcomes the load (torque) applied to the output shaft 26. The output side sun gear 36b, the output side planet gears 38e, 38f, 38g, 38h, the output side ring gear 42b, and the output side carrier 44b start rotating in the counterclockwise direction integrally with the input shaft 18, and the output side ring gear 42b is released from its locked state.

The outer OWL 54b is placed in a free state, and the output side sun gear 36b, the output side planet gears 38e, 38f, 38g, 38h, the output side ring gear 42b, and the output side carrier 44b are rotated in the counterclockwise direction integrally with the input shaft 18. During this situation, the output side planet gears 38e, 38f, 38g, 38g are not rotated, but they are in a state of revolution in the circumferential direction of the output side ring gear 42b. The output side ring gear 42b also is in a state of revolution, in the same manner as described above.

When a load (i.e., torque overcoming the static frictional force generated by the viscous resistance of the viscous fluid 66), which exceeds the preset torque, is applied, for example, from the driven apparatus to the output shaft 26, during a state in which the output side sun gear 36b, the output side planet gears 38e, 38f, 38g, 38h, the output side ring gear 42b, and the output side carrier 44b are rotated (revolved) in the counterclockwise direction integrally with the input shaft 18 as described above, then a force that acts to stop rotation of the output side carrier 44b, i.e., a force to rotate the output side ring gear 42b in the clockwise direction (rightward rotation direction) is generated. A locked state is given in which rotation of the output side ring gear 42b is stopped by the outer OWL 54b, which has been set beforehand to lock rotation in the clockwise direction, and a shift down is effected as described above.

As a result, a shift down state is given. Accordingly, a decelerated velocity of rotation and an increased torque are transmitted to the output shaft 26. The torque results from the force that corresponds to the gear ratio between the output side planet gears 38e, 38f, 38g, 38h and the output side ring gear 42b.

When the load (torque) applied to the output shaft 26 is decreased, as compared with the static frictional force previously set by the viscous fluid 66 after the shift down state, then the output side ring gear 42b is released from its locked state, and the outer OWL 54b is placed in a free state. Thus, the output side sun gear 36b, the output side planet gears 38e, 38f, 38g, 38h, the output side ring gear 42b, and the output side carrier 44b are rotated (revolved) in the counterclockwise direction integrally with the input shaft 18.

Next, an explanation shall be made concerning a situation in which a rotary driving force in the clockwise direction (rightward rotation direction), opposite to that discussed above, is applied to the input shaft 18 as viewed in a direction from the input shaft 18 to the output shaft 26 (i.e., in the direction of the arrow Z shown in FIG. 3), by switching the polarity of the current supplied to the rotary driving source.

When a rotary driving force in the clockwise direction is transmitted to the input shaft 18, a locked state (i.e., a state in which the input shaft 18 and the input side sun gear 36a are fixed) is provided by the inner OWL 34a, which is previously set so as to lock rotation in the clockwise direction. Further, the inner OWR 34b is placed in a free state, because the inner OWR 34b is previously set so as to permit rotation in the clockwise direction. The second planetary gear mechanism 14b makes no operation at all.

The inner OWL 34a, which constitutes the first planetary gear mechanism 14a, is placed in a locked state. A rotary driving force in the clockwise direction is transmitted to the input side sun gear 36a and to the four input side planet gears 38a, 38b, 38c, 38d. Further, a rotary driving force is transmitted to the input side ring gear 42a, which is meshed with the input side planet gears 38a, 38b, 38c, 38d.

That is, the input side sun gear 36a, which is locked by the inner OWL 34a, is rotated in a clockwise direction. Accordingly, the input side planet gears 38a, 38b, 38c, 38d rotate in the counterclockwise direction, in a direction opposite to that of the input side sun gear 36a, without undergoing revolution. The input side ring gear 42a, which is meshed with the four input side planet gears 38a, 38b, 38c, 38d, intends to rotate in the counterclockwise direction, while overcoming the viscous resistance of the viscous fluid 66.

During this situation, a rotary driving force in the counterclockwise direction (leftward rotation direction) is generated on the input side ring gear 42a. However, a locked state is given, in which rotation of the input side ring gear 42a is stopped by the outer OWR 54a, which has been previously set so as to lock rotation in the counterclockwise direction.

A shift down state is given at the moment the locked state is given, in which rotation of the input side ring gear 42a is prohibited. In the fixed state, in which rotation of the input side ring gear 42a is stopped, a state is given in which the input side sun gear 36a is rotated in the clockwise direction, and the four input side planet gears 38a, 38b, 38c, 38d rotate respectively in the counterclockwise direction, opposite to that of the input side sun gear 36a.

The output side sun gear 36b and the output side planet gears 38e, 38f, 38g, 38h, which constitute the second planetary gear mechanism 14b, are connected integrally by means of the intermediate carrier 44c. Therefore, rotation is effected integrally with the first planetary gear mechanism 14a subjected to the shift down, while the inner OWR 34b is retained in a free state.

After shift down, the load applied to the side of the output shaft 26 is gradually decreased, and the viscous resistance of the viscous fluid 66 overcomes the load. Then, the decreased load is transmitted to the first planetary gear mechanism 14a via the output side carrier 44b and the intermediate carrier 44c, whereby the input side ring gear 42a starts to be rotated in the clockwise direction in the same manner as the input shaft 18, and the locked state effected by the outer OWR 54a is released under action of the static frictional force generated by viscous resistance of the viscous fluid 66 applied between the input side sun gear 36a, the input side planet gears 38a, 38b, 38c, 38d, and the input side ring gear 42a.

The outer OWR 54a is placed in a free state, and the input side sun gear 36a, the input side planet gears 38a, 38b, 38c, 38d, the input side ring gear 42a, and the input side carrier 44a are rotated in the clockwise direction integrally with the input shaft 18. In this situation, the input side planet gears 38a, 38b, 38c, 38d do not rotate, while they are in a state of revolution in the circumferential direction of the input side ring gear 42a. The input side ring gear 42a also is in a state of revolution in the same manner as described above.

When a load in excess of the preset torque is applied, for example, from the driven apparatus to the side of the output shaft 26, in the state in which the input side sun gear 36a, the input side planet gears 38a, 38b, 38c, 38d, the input side ring gear 42a, and the input side carrier 44a are rotated in a clockwise direction integrally with the input shaft 18 as described above, a force that stops the rotation of the input side carrier 44a via the output side carrier 44b and the intermediate carrier 44c, i.e., a force that rotates the input side ring gear 42a in a counterclockwise direction (leftward rotation direction) is generated. Thus, a locked state is given, in which rotation of the input side ring gear 42a is stopped by the outer OWR 54a, which was set beforehand to lock rotation in the counterclockwise direction, and as described above, a shift down state is affected.

As a result, a shift down state is given. Accordingly, a decelerated velocity of rotation and an increased torque are transmitted to the output shaft 26. The torque results from the force that corresponds to the gear ratio between the input side planet gears 38a, 38b, 38c, 38d and the input side ring gear 42a.

When a load (torque), which is applied to the output shaft 26, is decreased as compared with the static frictional force previously set by the viscous fluid 66 after the shift down state, then the input side ring gear 42a is released from its locked state, and the outer OWR 54a is placed in a free state. The input side sun gear 36a, the input side planet gears 38a, 38b, 38c, 38d, the input side ring gear 42a, and the input side carrier 44a rotate (revolve) in the clockwise direction, integrally with the input shaft 18.

In the automatic speed reducing ratio-switching apparatus 10 according to the embodiment of the present invention, two planetary gear mechanisms, which are composed of the first planetary gear mechanism 14a and the second planetary gear mechanism 14b, including the input side and output side sun gears 36a, 36b and the input side and output side planet gears 38a to 38h, are juxtaposed in the axial direction of the input shaft 18. The inner OWL 34a and the inner OWR 34b, which have mutually different locking directions to prohibit rotation, are respectively provided. Further, the outer OWR 54a and the outer OWL 54b, which have mutually different locking directions to stop rotation of the input side and output side ring gears 42a, 42b, are respectively provided. A viscous coupling, which operates on the basis of the viscous fluid 66, is used to integrally rotate the input side and output side sun gears 36a, 36b, the input side and output side planet gears 38a to 38h, and the input side and output side ring gears 42a, 42b respectively in the same direction, so that the locked state is released. Accordingly, even when a rotary driving force in a clockwise or counterclockwise direction is applied to the input shaft 18, switching can smoothly be performed.

The inner and outer one-way clutch members 34a, 34b, 54a, 54b are disposed such that the rotation-permitting direction (locking direction) differs between the inner members and the outer members thereof respectively. The rotation-permitting direction (locking direction) also differs between the inner member and the outer member that make up the first and second planetary gear mechanisms 14a, 14b respectively.

In other words, in the embodiment of the present invention, the two planetary gear mechanisms 14a, 14b are used appropriately to operate any one of the planetary gear mechanisms 14a (14b) corresponding to the direction of rotation of the input shaft 18. Accordingly, a speed reducing ratio, which is transmitted, for example, from the output shaft 26 to a driven apparatus such as an actuator, can automatically be switched.

Therefore, in the embodiment of the present invention, it is unnecessary to provide, for example, a member that is displaced in the axial direction of the input shaft 18, corresponding to the direction of rotation of the input shaft 18. Therefore, even when a large torque is applied, it is possible to smoothly transmit the torque to the output shaft 26. As a result, for example, the gears that make up the planetary gear mechanisms 14a, 14b need not be large in size. Thus, it is possible to provide an automatic speed reducing ratio-switching apparatus 10, which is both lightweight and small in size.

Even when the displacement member (slider) of the actuator is once stopped in an outgoing route, and the displacement member is displaced again in a direction along the outgoing route, then the speed reducing ratio can be automatically switched by operating the first planetary gear mechanism 14a or the second planetary gear mechanism 14b respectively, corresponding to the direction of rotation of the input shaft 18. Further, the displacement member of the actuator can be displaced along the outgoing route at a low torque and high speed. It is a matter of course that the actuator may be made up of various other actuators including, for example, linear actuators and rotary actuators.

Next, an explanation shall be given concerning applicable fields of use of the automatic speed reducing ratio-switching apparatus 10 constructed as described above.

The automatic speed reducing ratio-switching apparatus 10 can be applied and utilized in all fields concerning rotary systems, which are operated while making corrections when load resistance is increased or decreased, in accordance with variations in load imposed on the power source.

The automatic speed reducing ratio-switching apparatus 10 may be applied, for example, to vehicles, ships, airplanes, agricultural machinery (for example, cultivators and lawn mowers), tanks, heavy weight vehicles (for example, large-sized construction machines and mining machines), press machines, compressors, electric generators, food machines, machine tools, lifter mechanisms, speed change (transmission) devices used in nursing, vertical/horizontal movement apparatuses, wheelchairs (including electric and manual wheelchairs), door opening/closing mechanisms, sliding door opening/closing mechanisms, tightening mechanisms used for closing sliding doors, opening/closing mechanisms for roofs, and various brake mechanisms (including drum brakes and disc brakes).

Vehicles include automobiles carried by, for example, power engines (including gasoline engines and diesel engines), fuel cell driven motors, and hybrid systems. In this case, the rotary driving source is not limited to electric motors, but may be driven by human power, internal combustion engines, hydraulic power, oil pressure, or pneumatic sources.

In the present invention, a high speed rotation type motor can be used as a high torque motor. High speed rotation can be performed in a region in which torque is not required. In other words, when the load is decreased, a conventionally geared motor can be rotated at high speed. Further, the diameter of the motor can be reduced to realize a small size.

Figure 10:
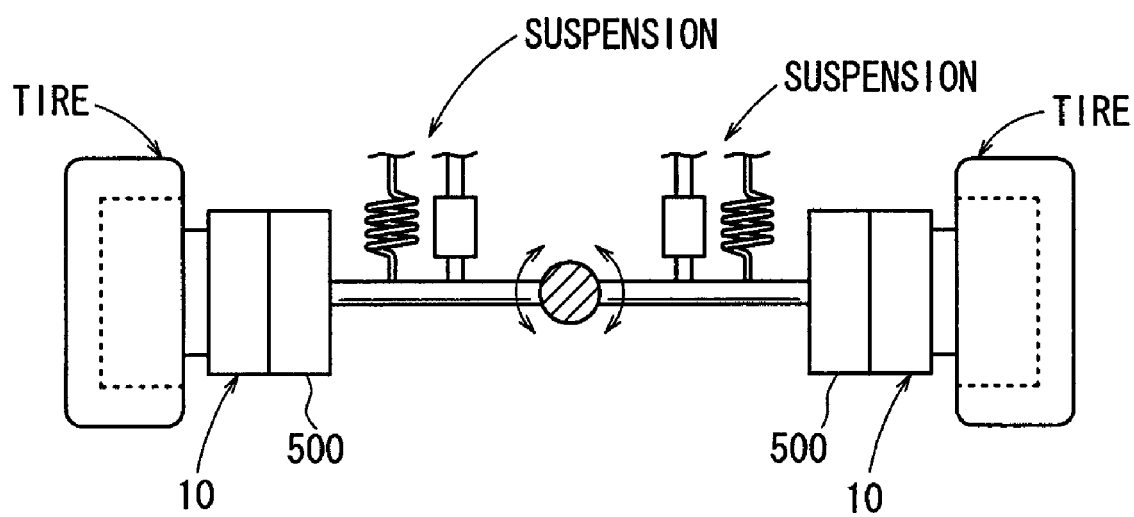
FIG. 10 is, with partial omission, a side view in which the automatic speed reducing ratio-switching apparatus according to the embodiment of the present invention is applied to a motor for driving wheels.

Portions where the invention may appropriately be used in vehicles include wiper motors, power window motors, power seat motors, driving motors for slide doors, and driving motors for automobiles. When the present invention is applied to a wiper motor, the wiper can be smoothly started and operated, even when resistance of snow, the blade or the like is increased. The wheel driving motors of automobiles include various motors 500 such as DC motors, induction motors, and in-wheel motors, as shown in FIG. 10. Along with facilitating miniaturization of the motor 500, output (torque) can be increased when obstacles or uphill slopes are encountered. In the case of the in-wheel motor, it is possible to effectively use a small-sized speed change or transmission device of the self-propelled type, for the following reason. That is, if in-wheel motors are incorporated into the respective wheels, it is difficult to incorporate them when a conventional automatic speed change or transmission device is used due to its large size. Conventionally, incorporation of a planetary gear mechanism into an in-wheel motor is known. When such a system is used in combination with the automatic speed reducing ratio-switching apparatus according to the embodiment of the present invention, it is possible to construct an in-wheel motor, which can be equipped with a speed change or transmission device having a smaller size.

Next, FIGS. 40A to 40D show combination patterns of the automatic speed reducing ratio-switching apparatus 10 according to the embodiment of the present invention together with the planetary gear mechanism. In the respective patterns shown in FIGS. 40A and 40B, a single planetary gear mechanism 501 is arranged on either the input side or the output side of the automatic speed reducing ratio-switching apparatus 10. Accordingly, the speed reducing ratio can be set within a range of 1/12 to 1/4.

Figure 40A:
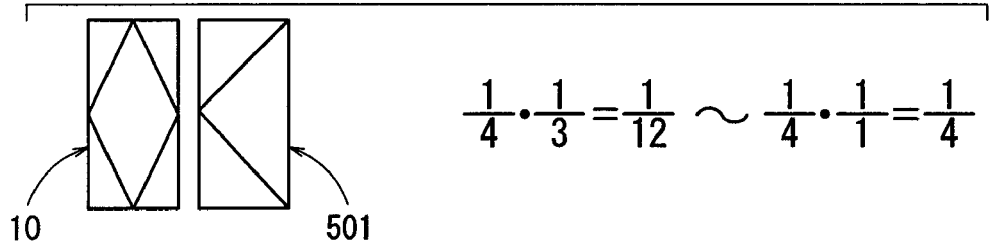
FIGS. 40A to 40D are views showing schematic arrangements illustrating combination patterns of the automatic speed reducing ratio-switching apparatus according to the embodiment of the present invention and the planet gear mechanism respectively.
Figure 40B:
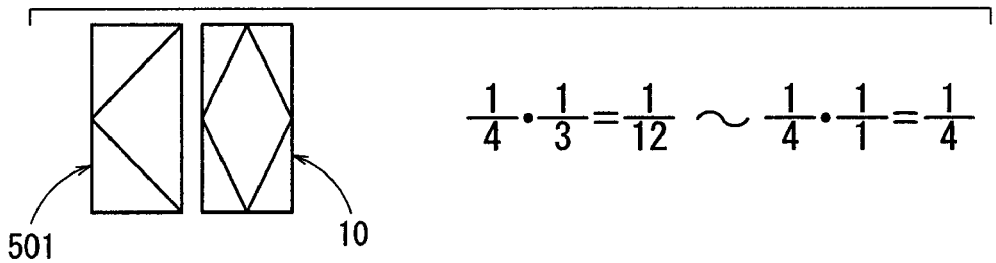
Figure 40C:
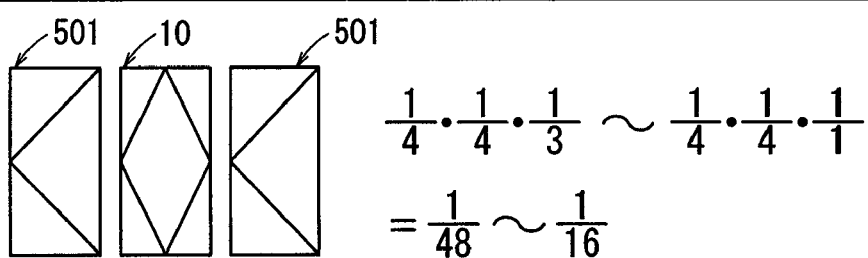

In the pattern shown in FIG. 40C, individual planetary gear mechanisms 501 are arranged on both the input side and the output side of the automatic speed reducing ratio-switching apparatus 10 respectively. Accordingly, the speed reducing ratio can be set within a range of 1/48 to 1/16.

Figure 40D:
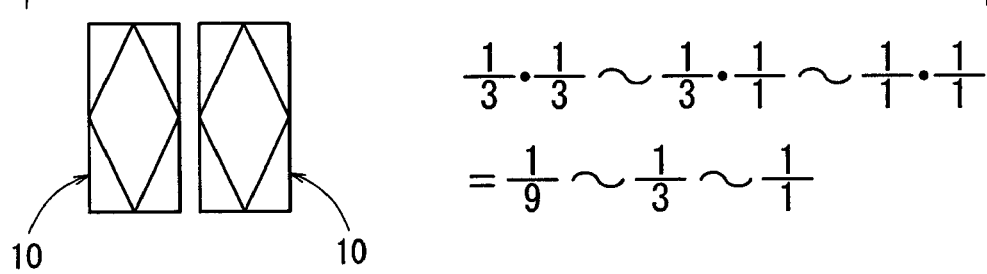

In the pattern shown in FIG. 40D, two automatic speed reducing ratio-switching apparatuses 10 are combined. Accordingly, the speed reducing ratio can be set within a range of 1/9 to 1/3 to 1/1.

Figure 11:
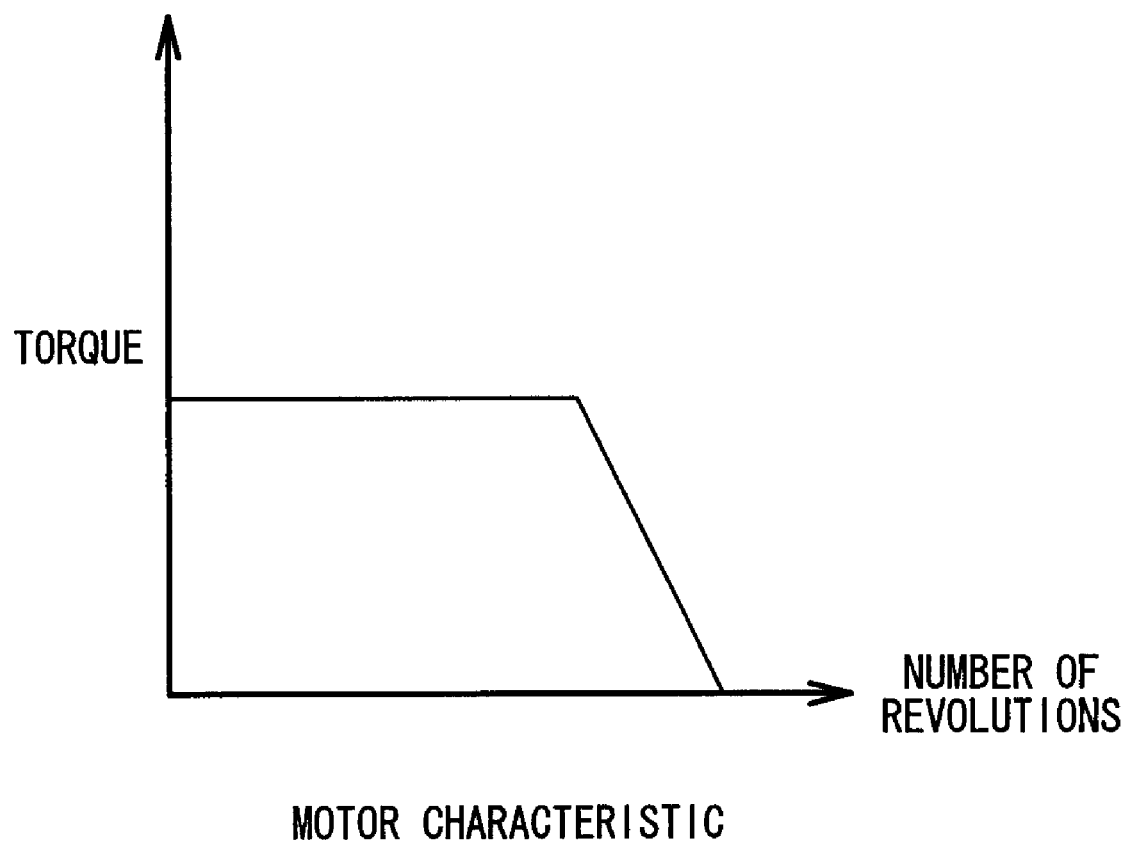
FIG. 11 is a view showing motor characteristics, which illustrate the relationship between the number of revolutions and torque.
Figure 12:
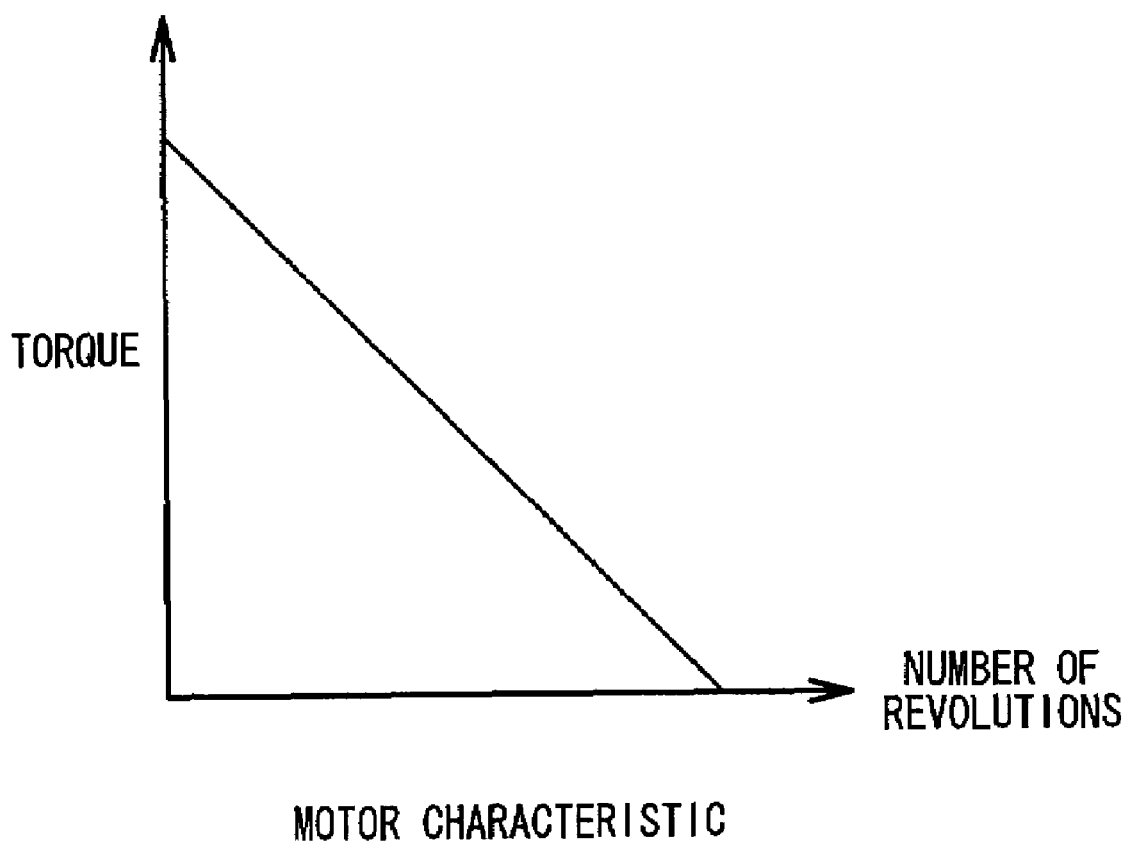
FIG. 12 is a view showing motor characteristics, which illustrate the relationship between the number of revolutions and torque.

As for the motor input pattern, either a type in which torque is constant with respect to the number of revolutions (see FIG. 11), or a type in which torque is changed with respect to the number of revolutions (see FIG. 12), may be adopted.

Figure 13A:
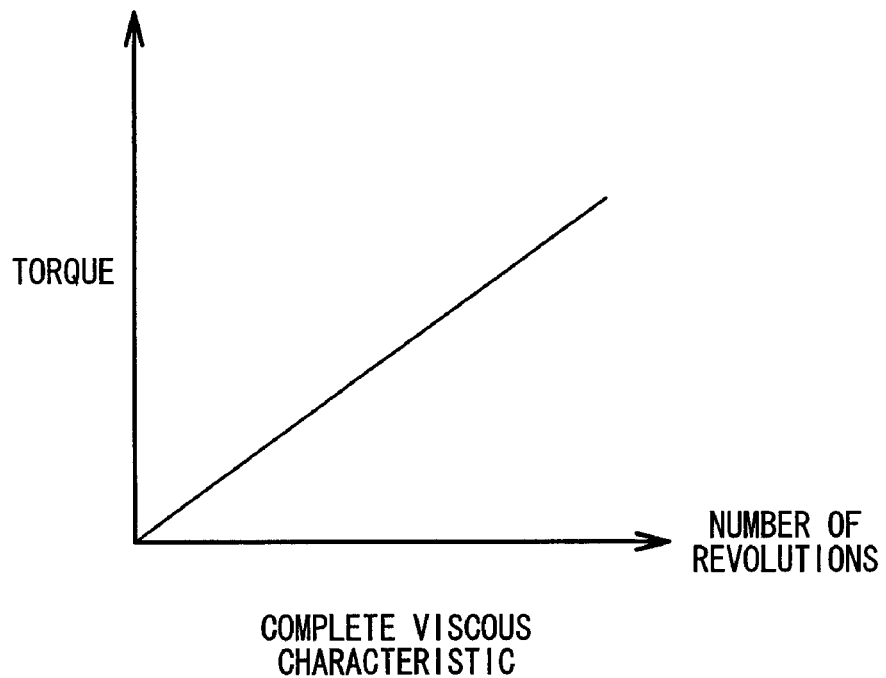
FIG. 13A is a view showing complete viscous characteristics, in which the relationship between the number of revolutions and torque is linear.
Figure 13B:
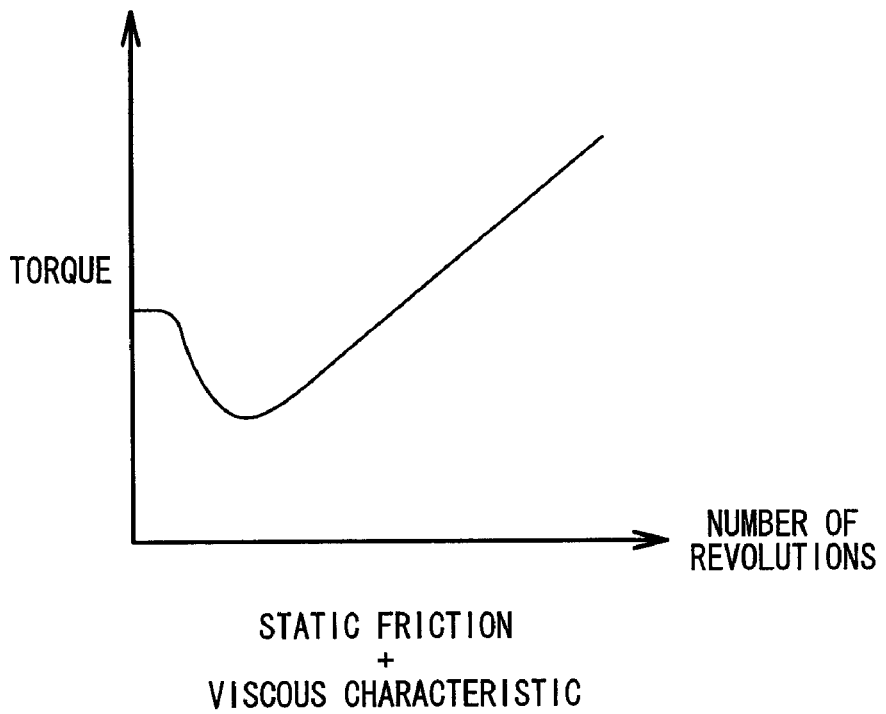
FIG. 13B shows static friction and viscous characteristics, in which the relationship between the number of revolutions and torque is changed.
Figure 14:
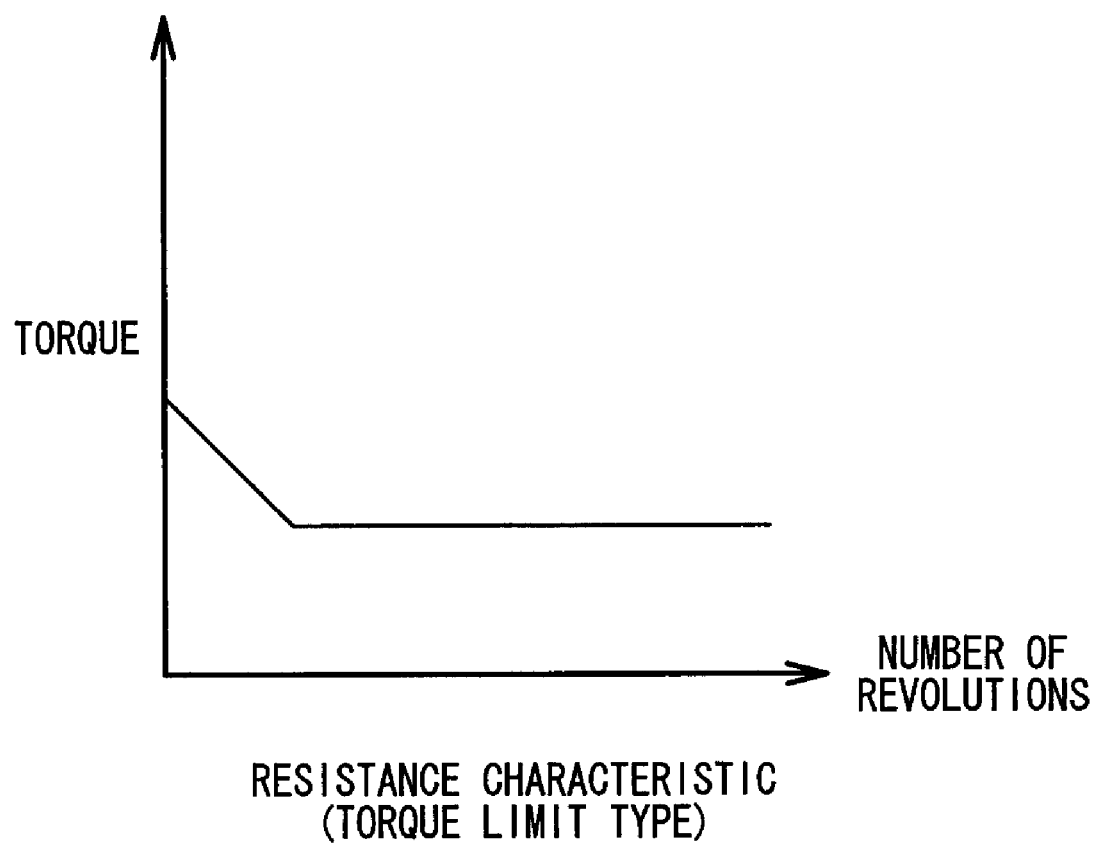
FIG. 14 is a view showing resistance characteristics, illustrating the relationship between the number of revolutions and torque.
Figure 15A:
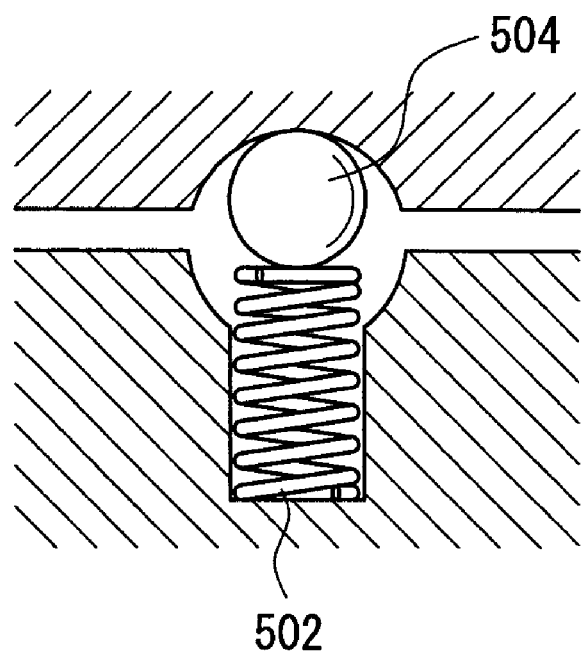
FIG. 15A is a vertical sectional view illustrating a detent mechanism, in which a ball is fastened by being pressed by a spring.
Figure 15B:
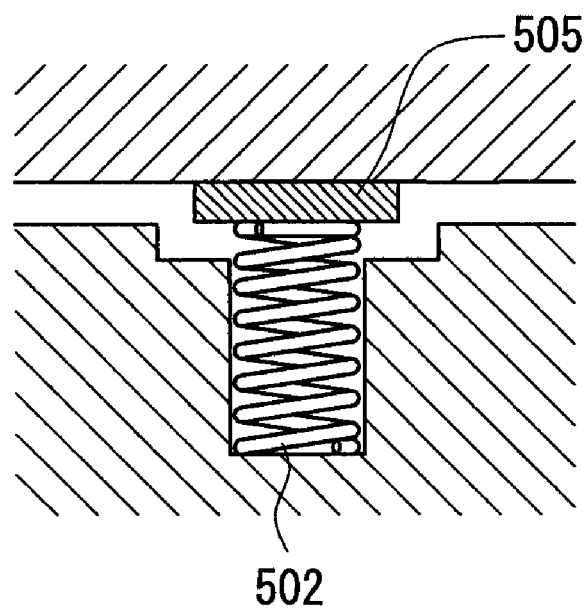
FIG. 15B shows a vertical sectional view illustrating a static friction mechanism, in which a friction member is fastened by being pressed by a spring.
Figure 16:
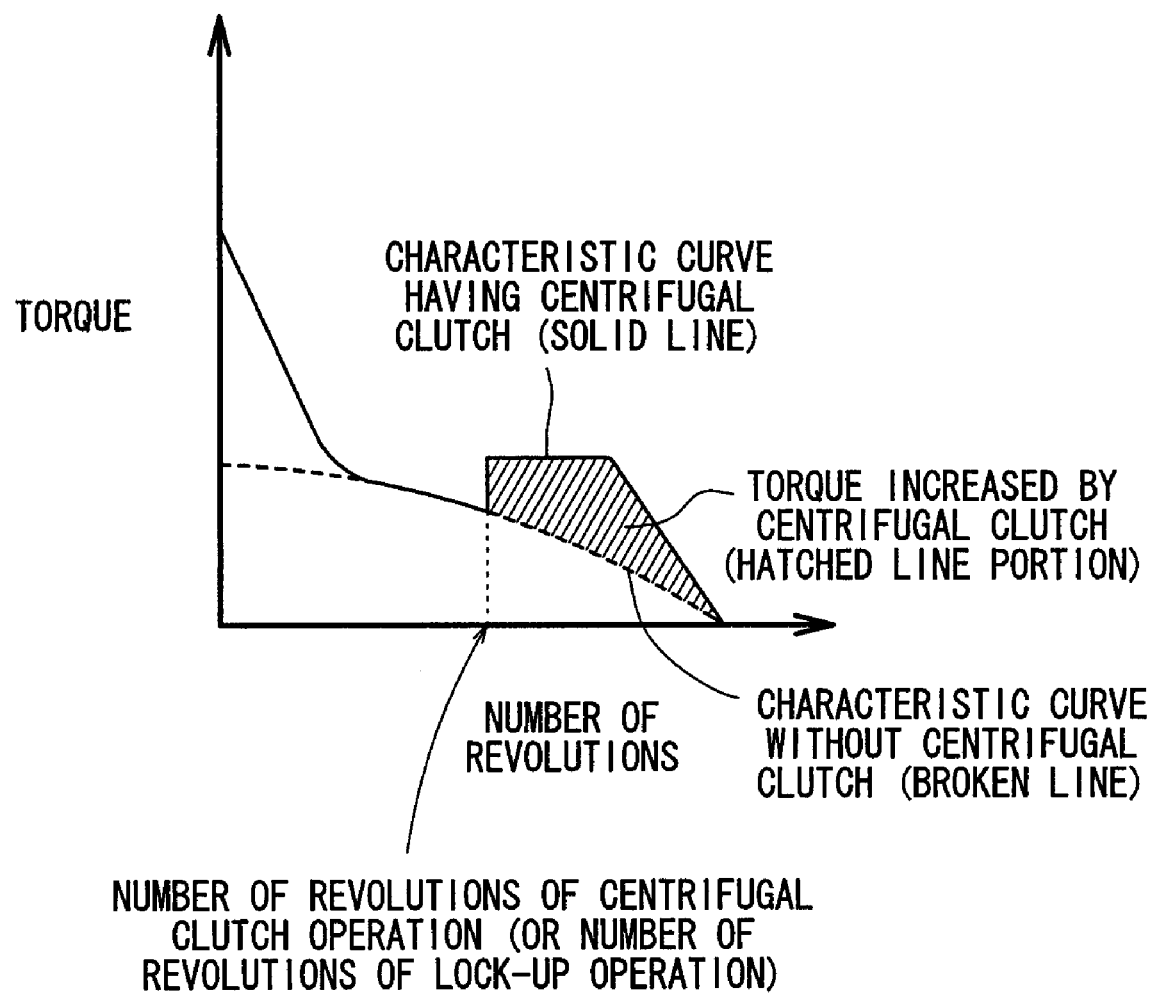
FIG. 16 is a view showing characteristics illustrating changes in torque with respect to the number of revolutions, and depending on the presence or absence of a lockup mechanism or a centrifugal clutch mechanism.

As for the switching pattern of the resistance characteristics of the planet gears, concerning the relationship between the difference in rotation speed and generated torque, any of the following types may be adopted, i.e., a type in which torque is changed linearly (proportionally) in accordance with a complete viscous coupling characteristic (solely a lubricating oil characteristic) (see FIG. 13A), a type in which torque is changed in a curved form while including a static friction-generating mechanism (for example, a mechanism in which a friction plate 505 is pressed by a spring 502 in order to generate static friction, as shown in FIG. 15B) in the viscous coupling characteristic described above (see FIG. 13B), a type in which a torque limit is included in the carrier/internal gear, wherein torque is kept constant after having been once lowered (see FIG. 14), and a type in which a detent (to effect a fastening action by pressing a ball 504 with a spring 502, for example, as shown in FIG. 15A) is included in the carrier/internal gear.

In the arrangement described above, as for the seal member for enclosing oil (for example, lubricating oil) inside the planetary gear mechanism, for example, the O-ring and the wear ring have resistance characteristics including a static friction and/or a fluid lubrication characteristic, which can be used conveniently as the seal member. An O-ring elastic member may be utilized in place of the spring member shown in FIG. 13B. Such a structure is often utilized as a seal member for hydraulic cylinders.

The spiral-jaw clutch is used as a one-way clutch. However, an arrangement may be provided in which the balls, the roller, and the sprag type one-way clutch are assembled integrally with the bearing, without using the jaw as a one-way clutch. In this arrangement, a square-jaw clutch or a Carbic coupling for connection with respect to the ring gear may be used.

The automatic speed reducing ratio-switching apparatus 10 may appropriately be applied, for example, to press working apparatuses, bending processing apparatuses, mold-closing apparatuses, injection molding machines, and die casting molding apparatuses. In the various processing/forming apparatuses described above, it is required that a large force (high torque) be generated by the movable element in the vicinity of the displacement terminal end, wherein the time required to arrive at the displacement terminal end is shortened in order to improve production efficiency.

Figure 17:
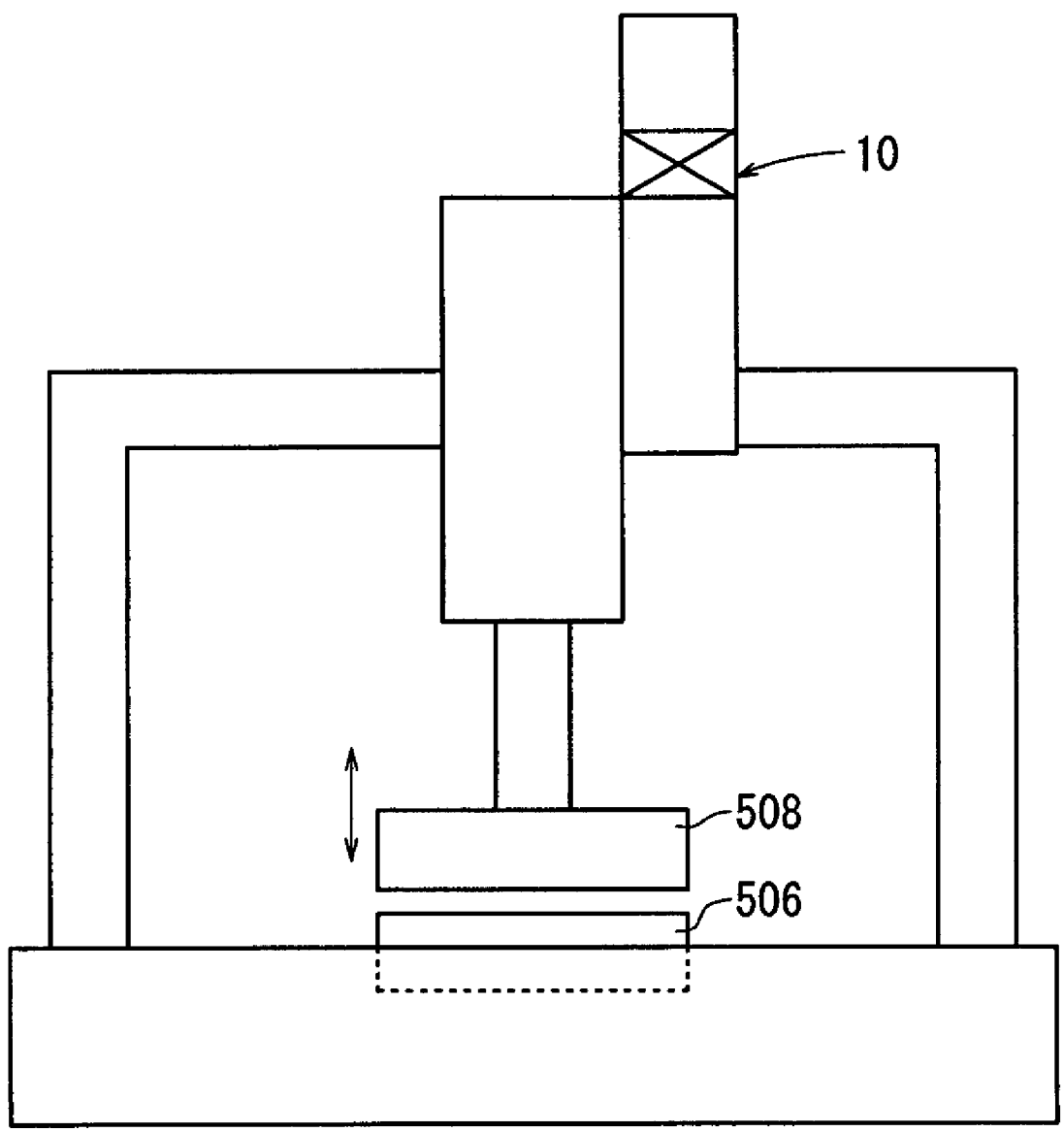
FIG. 17 is a view showing a schematic arrangement in which the automatic speed reducing ratio-switching apparatus according to the embodiment of the present invention is applied to a press machine.

More specifically, a large acceleration must be applied in order to perform displacement at a high speed in one stroke of the movable element (note also the upper die 508 approaches and separates with respect to the lower die 506, as shown in FIG. 17) so that movement is effected quickly toward the displacement terminal end position while only scarcely performing work, whereby a large force is generated at the displacement terminal end position.

In the case of the various processing/forming apparatuses described above, in many cases, the apparatuses are used while connected, for example, to a variable speed change mechanism, such as a toggle link mechanism or a cam mechanism, at the displacement terminal end position. However, the automatic speed reducing ratio-switching apparatus 10 is a simple self-propelled variable speed change mechanism, wherein costs can be reduced, thus making it useful for FA equipment. Additionally, when the automatic speed reducing ratio-switching apparatus 10 is incorporated into a servo motor portion in a rapid traverse mechanism of an electric servo gun, then the servo motor can be miniaturized, and improvements in characteristics thereof can be achieved by decreasing the load exerted on the forward end portion of the robot.

Figure 18:
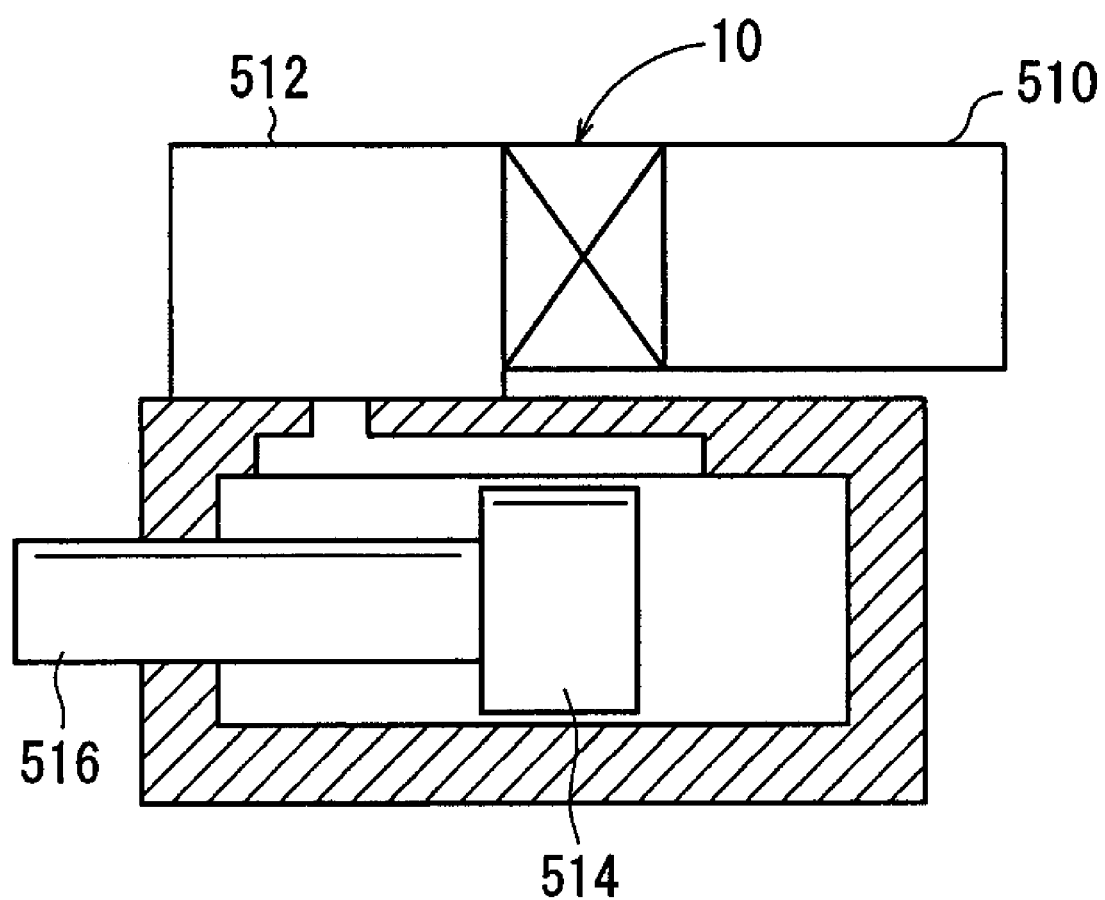
FIG. 18 is a view showing a schematic arrangement in which the automatic speed reducing ratio-switching apparatus according to the embodiment of the present invention is applied to a motor for driving an axial pump.

FIG. 18 shows a state in which a piston 514 and a piston rod 516 are displaced by pressure oil discharged from an axial pump 512, which is driven by a motor 510 assembled with the automatic speed reducing ratio-switching apparatus 10. Electric hydraulic systems have been already proposed by the present applicant as described, for example, in U.S. Patent Publication Nos. 2004-71563, 2005-87068 and 2005-22523. When the automatic speed reducing ratio-switching apparatus 10 is assembled with a motor for driving an axial pump, a small sized lightweight motor can be provided for use in the electric hydraulic system.

Figure 19:
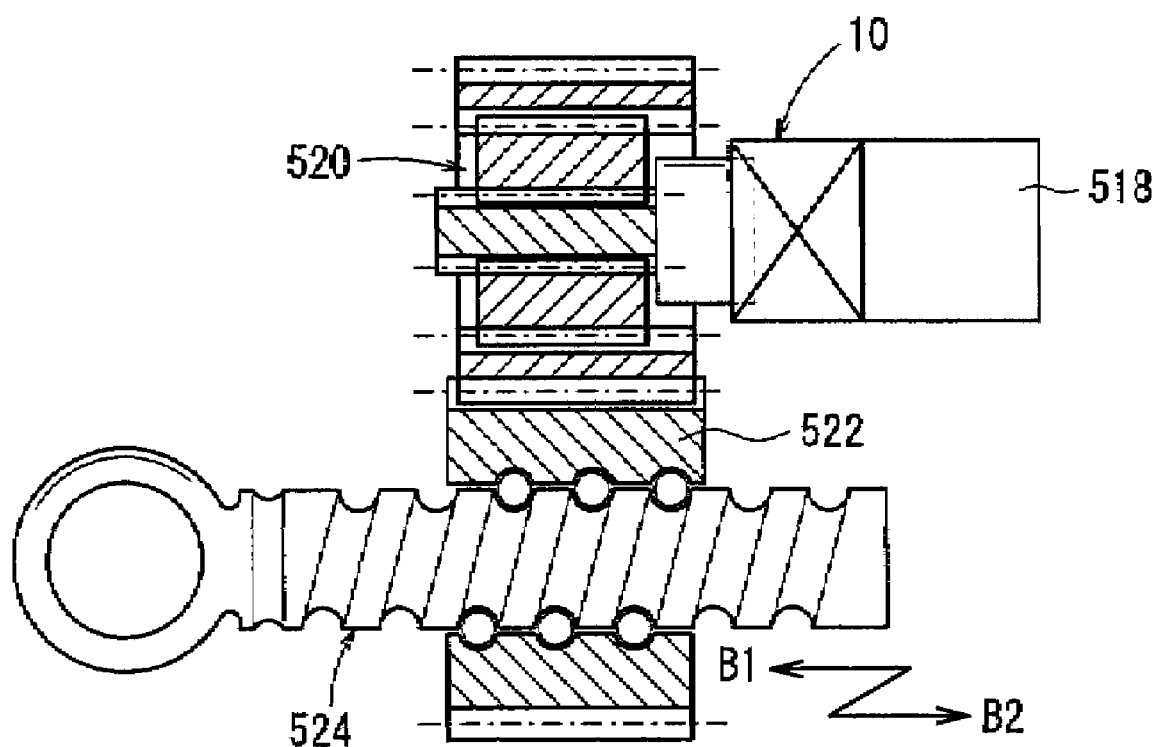
FIG. 19 is a view showing a schematic arrangement in which the automatic speed reducing ratio-switching apparatus according to the embodiment of the present invention is applied to a motor for driving a ball screw mechanism.

FIG. 19 shows a state in which a nut member 522 is rotated in a predetermined direction under a driving action of a planetary gear mechanism 520, using a motor 518 assembled with the automatic speed reducing ratio-switching apparatus 10, and wherein a ball screw shaft 524 engaged with the nut member 522 is displaced in the direction of arrow B1 or B2.

Figure 20:
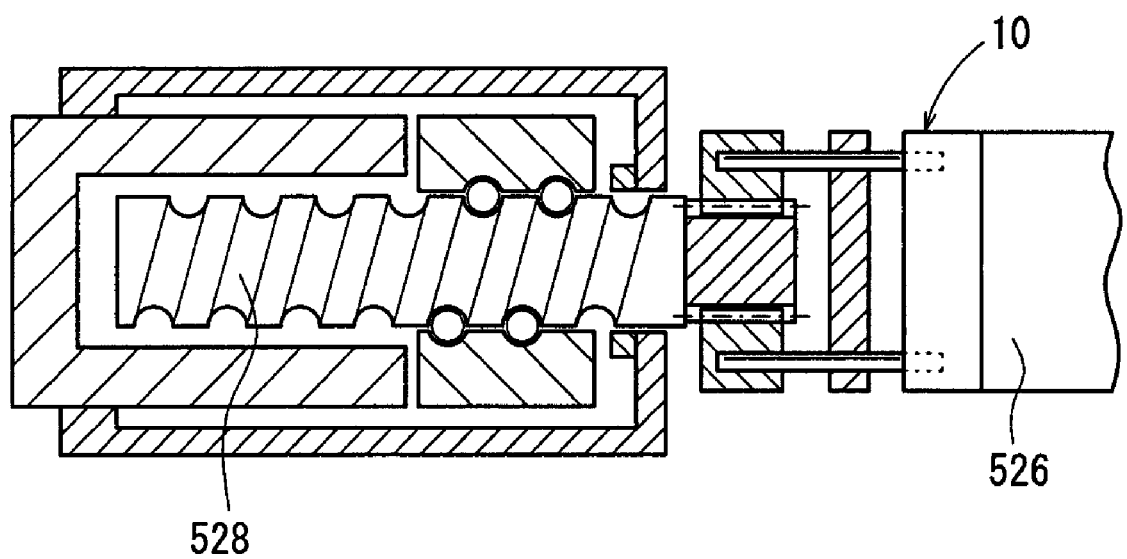
FIG. 20 is a view showing a schematic arrangement in which the automatic speed reducing ratio-switching apparatus according to the embodiment of the present invention is applied to a motor for driving a ball screw shaft.
Figure 21:
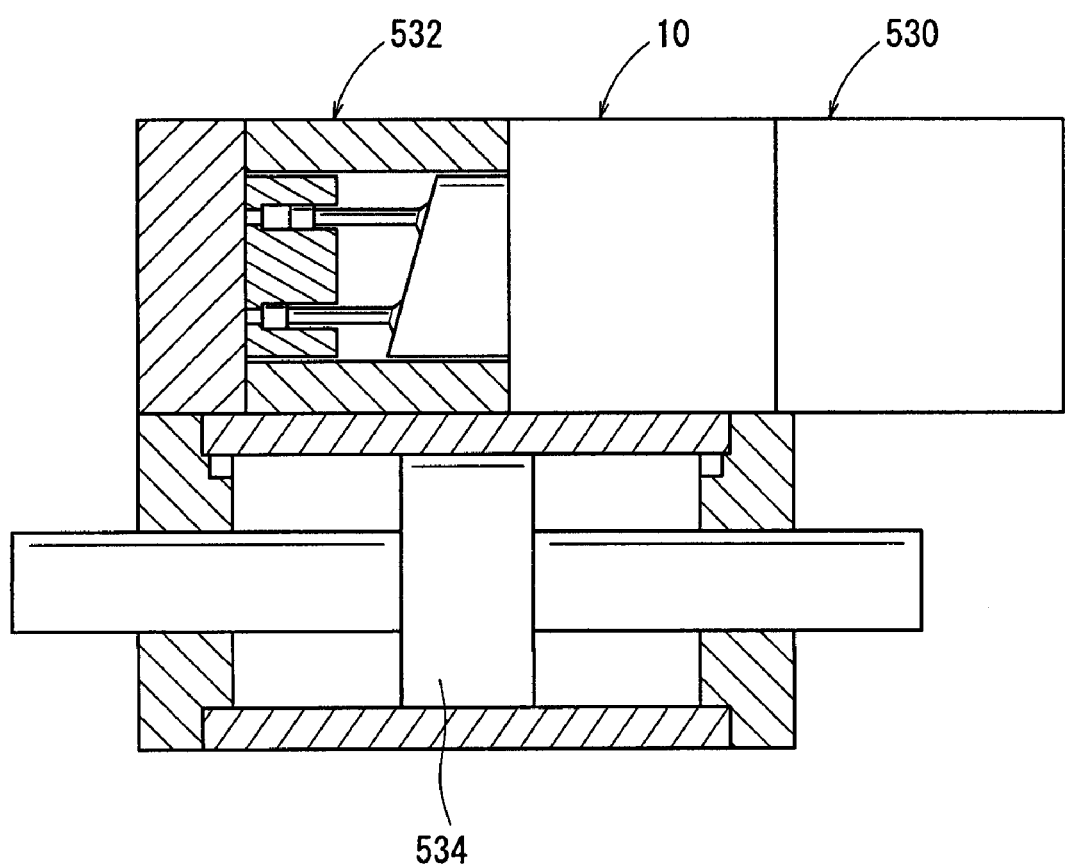
FIG. 21 is a view showing a schematic arrangement in which the automatic speed reducing ratio-switching apparatus according to the embodiment of the present invention is applied to a motor for driving an axial pump.

FIG. 20 shows a state in which a ball screw shaft 528 is rotated by a motor 526 assembled with the automatic speed reducing ratio-switching apparatus 10. FIG. 21 shows a state in which a piston 534 having rods on both sides thereof is displaced by pressure oil discharged from an axial pump 532 that is driven by a motor 530, which is assembled together with the automatic speed reducing ratio-switching apparatus 10.

Figure 22:
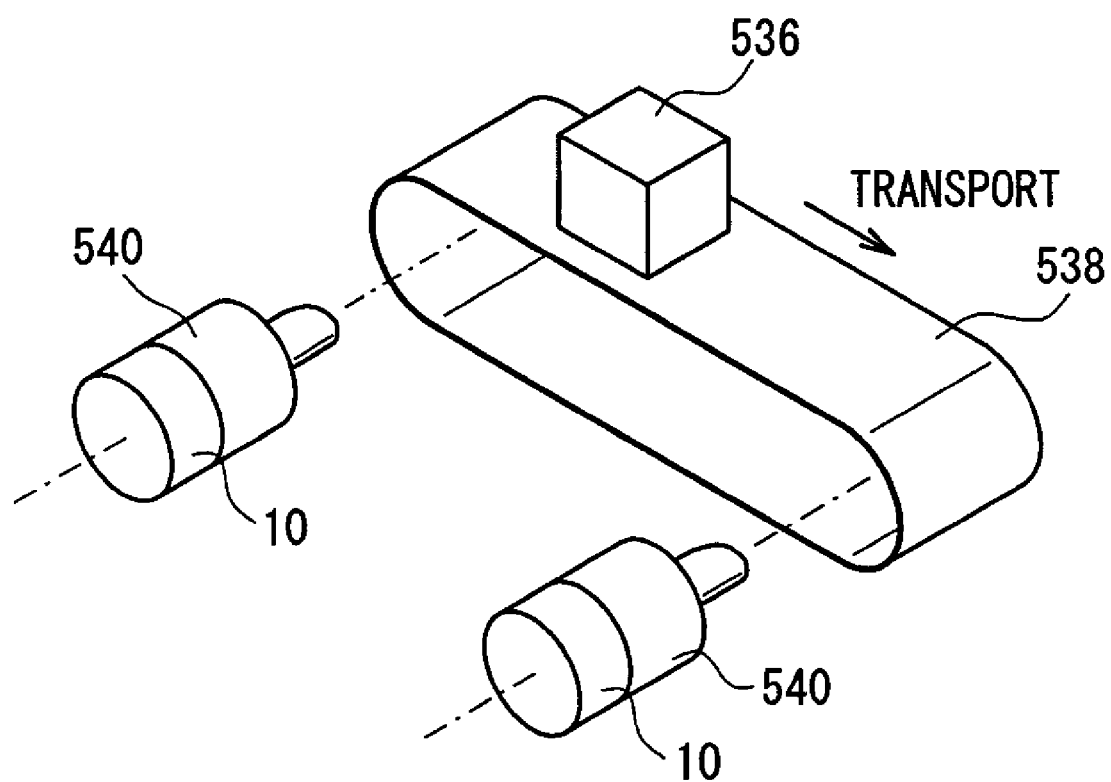
FIG. 22 is a view showing a schematic arrangement in which the automatic speed reducing ratio-switching apparatus according to the embodiment of the present invention is applied to a geared motor for driving a conveyor.
Figure 23:
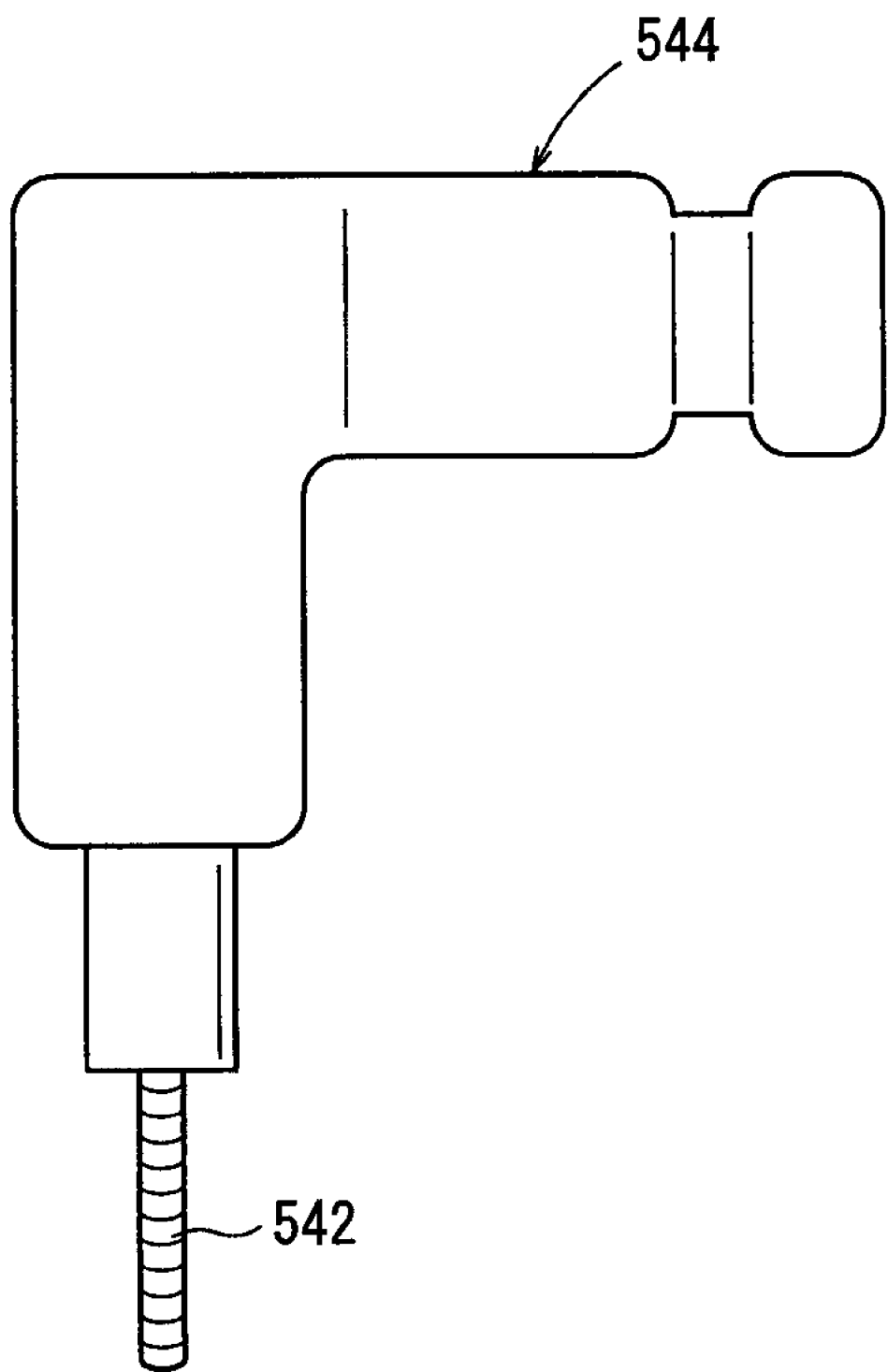
FIG. 23 is a front view illustrating an electric drill.
Figure 24:
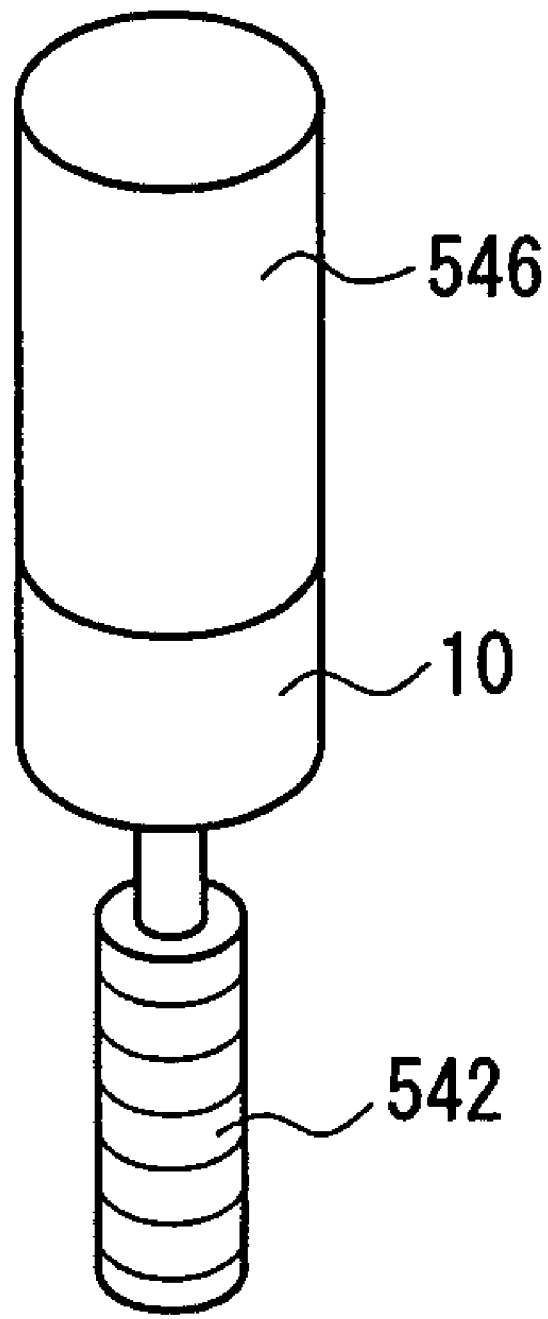
FIG. 24 is a perspective view in which the automatic speed reducing ratio-switching apparatus according to the embodiment of the present invention is applied to a motor for driving a drill member of an electric drill.
Figure 25:
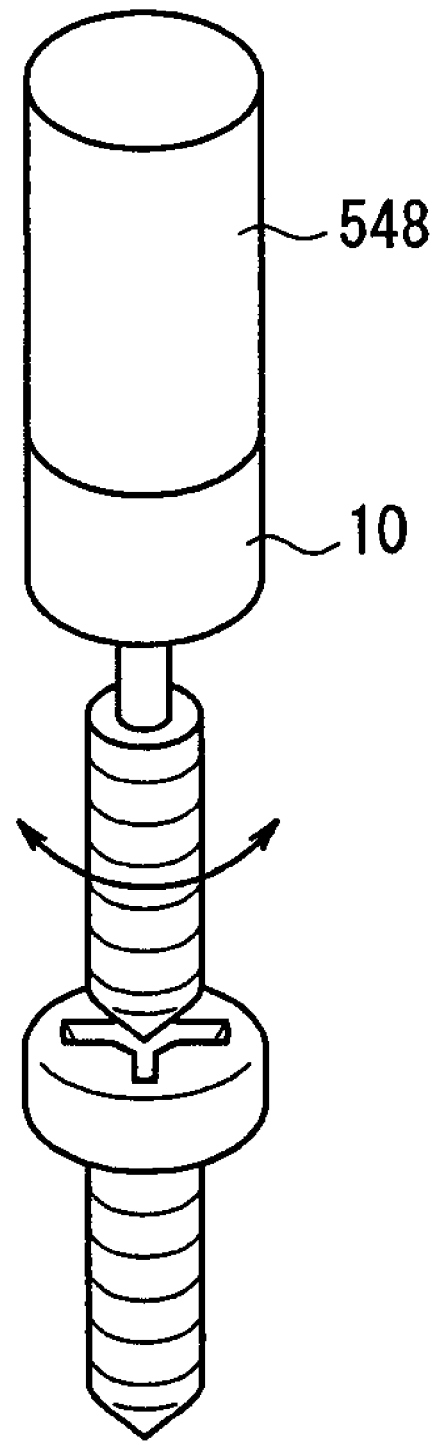
FIG. 25 is a perspective view in which the automatic speed reducing ratio-switching apparatus according to the embodiment of the present invention is applied to a motor of a screw fastening machine.

The automatic speed reducing ratio-switching apparatus 10 is preferably utilized while integrally assembled, for example, to any of a conveyer motor or a geared motor 540, for transporting heavy materials 536 by means of a conveyer 538 (see FIG. 22), a spindle motor 546 of an electric drill 544 used for cutting-machining a workpiece by rotating a drill member 542 (see FIGS. 23 and 24), a pulse motor 548 of a screwing machine used for screwing both tapping screws and ordinary screws (see FIG. 25), a brushless DC motor, a brush-equipped DC motor, an induction motor, and an AC servo motor.

Figure 26:
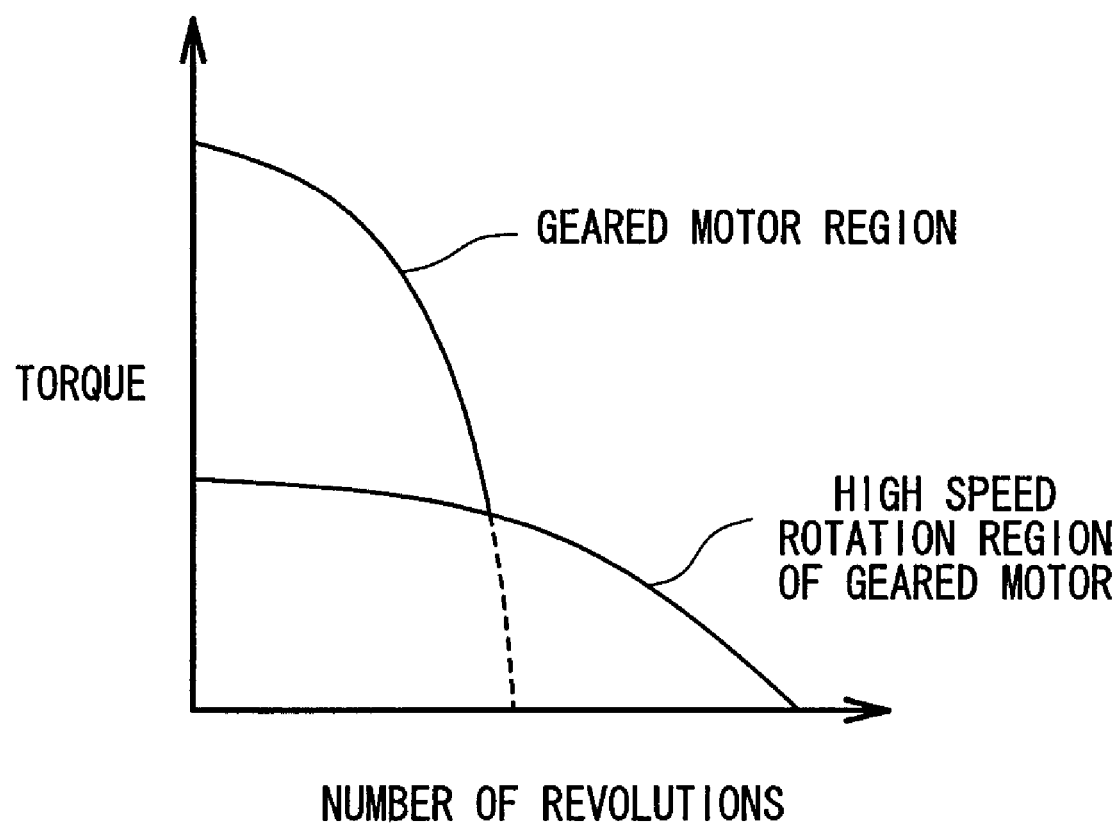
FIG. 26 is a view showing characteristics illustrating torque change with respect to the number of revolutions of a geared motor.
Figure 27:
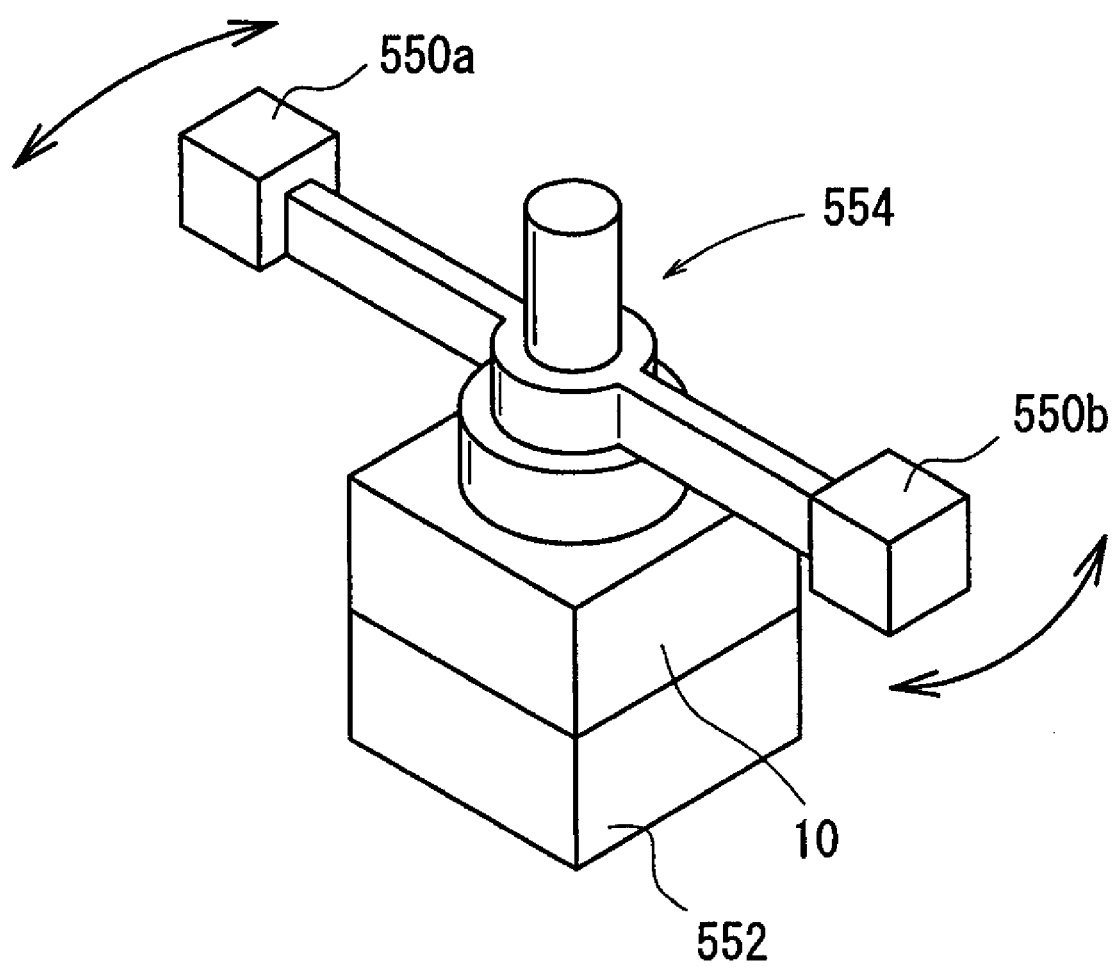
FIG. 27 is a perspective view in which the automatic speed reducing ratio-switching apparatus according to the embodiment of the present invention is applied to a rotary actuator for rotating a workpiece.
Figure 28:
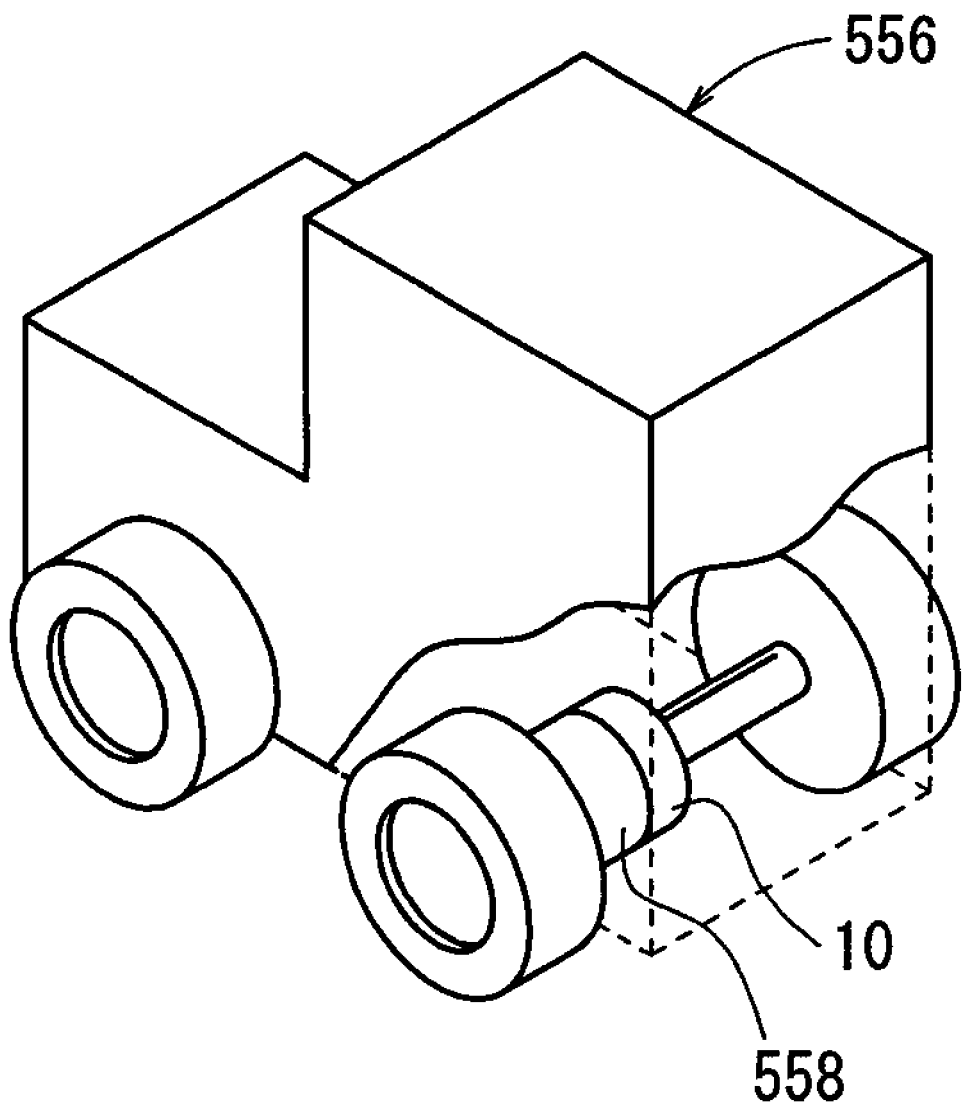
FIG. 28 is a perspective view in which the automatic speed reducing ratio-switching apparatus according to the embodiment of the present invention is applied to a motor for driving an electric wheelchair.

When the present invention is applied to a geared motor, both high torque of the geared motor as well as high-speed rotation can be achieved when a load is applied at low torque (see FIG. 26).

When the automatic speed reducing ratio-switching apparatus 10 is applied to a rotary actuator 554, in which workpieces 550a, 550b are rotated by a motor 552, a FA apparatus having high efficiency, wherein acceleration can be performed at high torque during acceleration operations performed while effecting floating and guiding operations at low resistance, can be provided during linear/rotational operations. For example, the number of revolutions can be increased using a greater part of the power during acceleration, and thereafter the workpieces can be rotated only by inertia.

Figure 29:
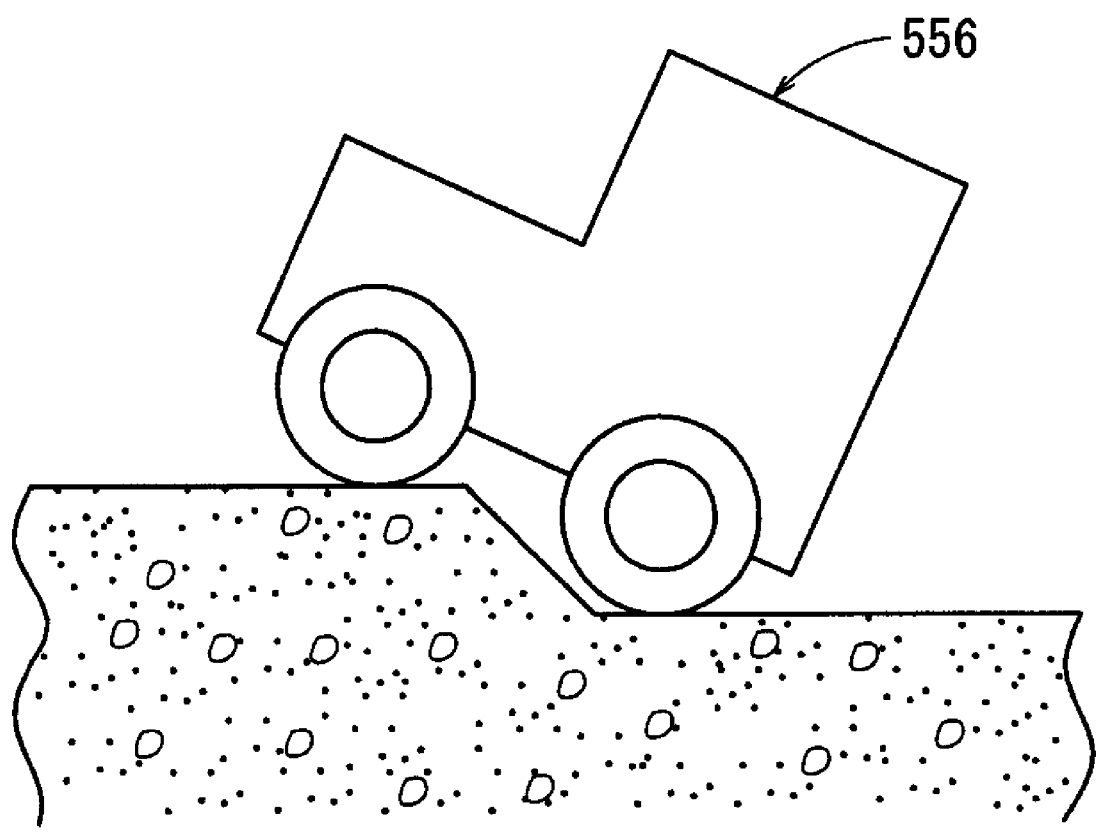
FIG. 29 is a side view illustrating a state in which the electric wheelchair shown in FIG. 28 rises over a step.

When the automatic speed reducing ratio-switching apparatus 10 is applied to an electric wheelchair 556 or to an electric vehicle (for example, a hybrid automobile or an automobile carrying an electric motor 558 driven by a fuel cell), the wheelchair 556 or the vehicle can ride across a step while the speed thereof is automatically lowered and torque is increased, when the wheelchair 556 or the vehicle rides across a step that rises from a flat surface (see FIG. 29). Torque can also be manually increased by applying rotational force from the hands.

Figure 30:
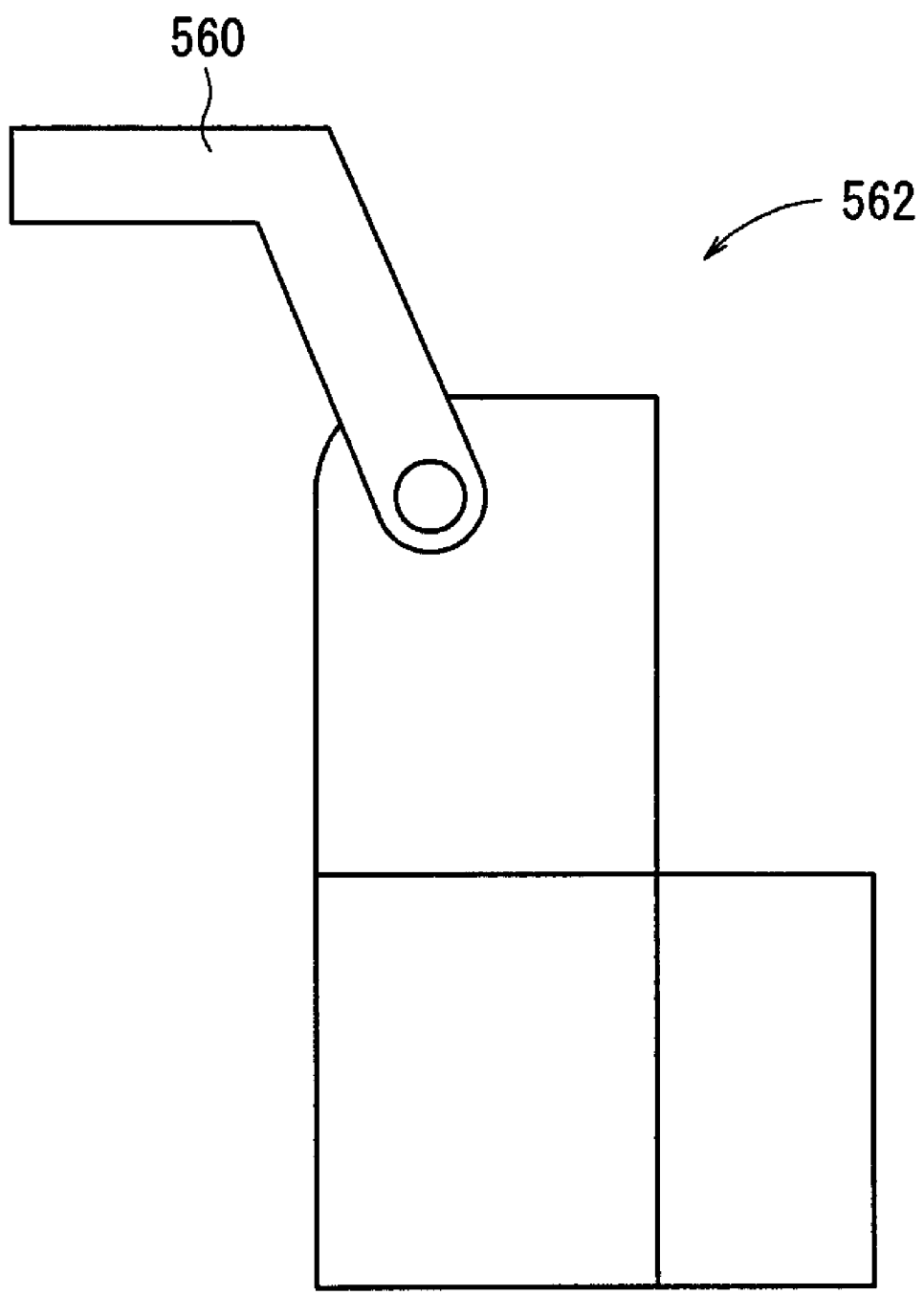
FIG. 30 is a side view in which the automatic speed reducing ratio-switching apparatus according to the embodiment of the present invention is applied to a clamp apparatus.

When the automatic speed reducing ratio-switching apparatus 10 is used in combination with a caulking apparatus, a clamp apparatus 562 for clamping a workpiece by rotation of an arm 560 portion thereof (see FIG. 30), a cam mechanism for mold clamping, or a toggle link mechanism, for example, the operational force of the cam mechanism and the toggle link mechanism can be increased. When an operational force is not exerted, high speed displacement can be effected.

The automatic speed reducing ratio-switching apparatus 10 may be appropriately applied, for example, to a tightening mechanism or a rapid traverse mechanism used, for example, for a vise (including a vise that functions as a clamp for fixing a workpiece), a clamp, and a chuck (including a chuck of a numerically controlled machine).

Figure 31:
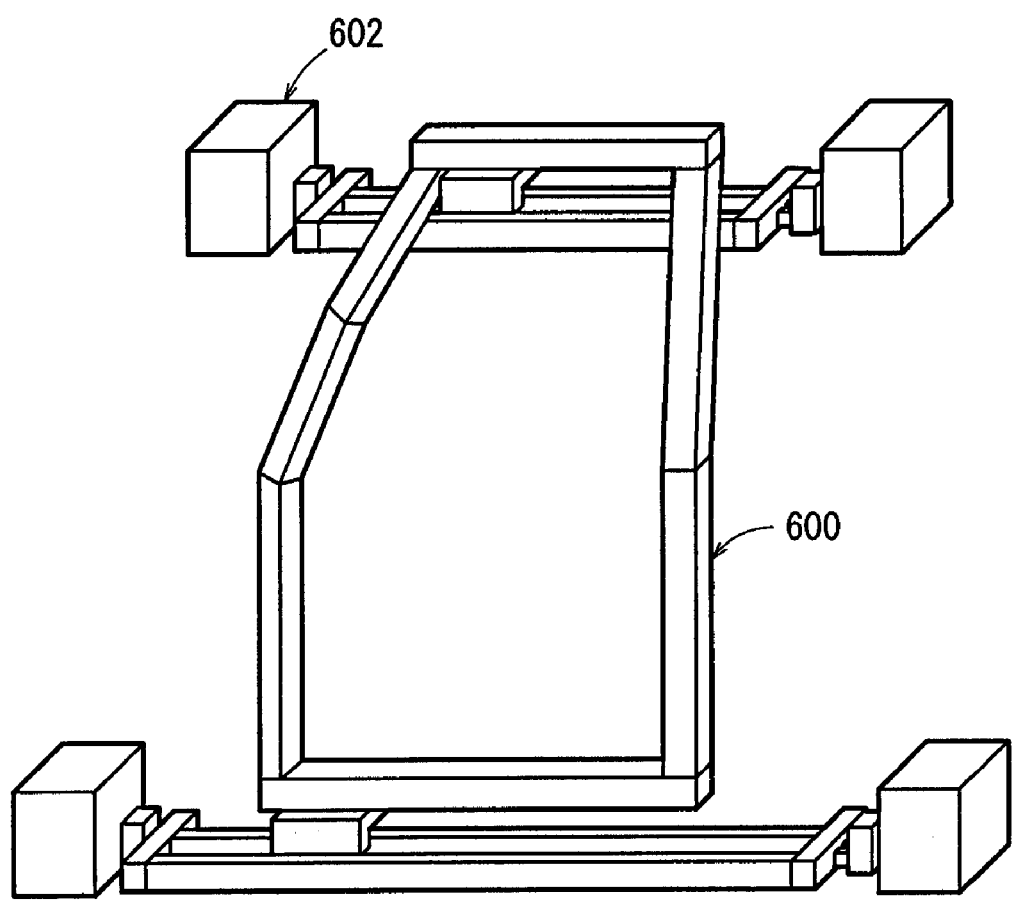
FIG. 31 is a front view illustrating a slide door disclosed in a conventional technique, and to which the automatic speed reducing ratio-switching apparatus according to the embodiment of the present invention is applied.
Figure 32:
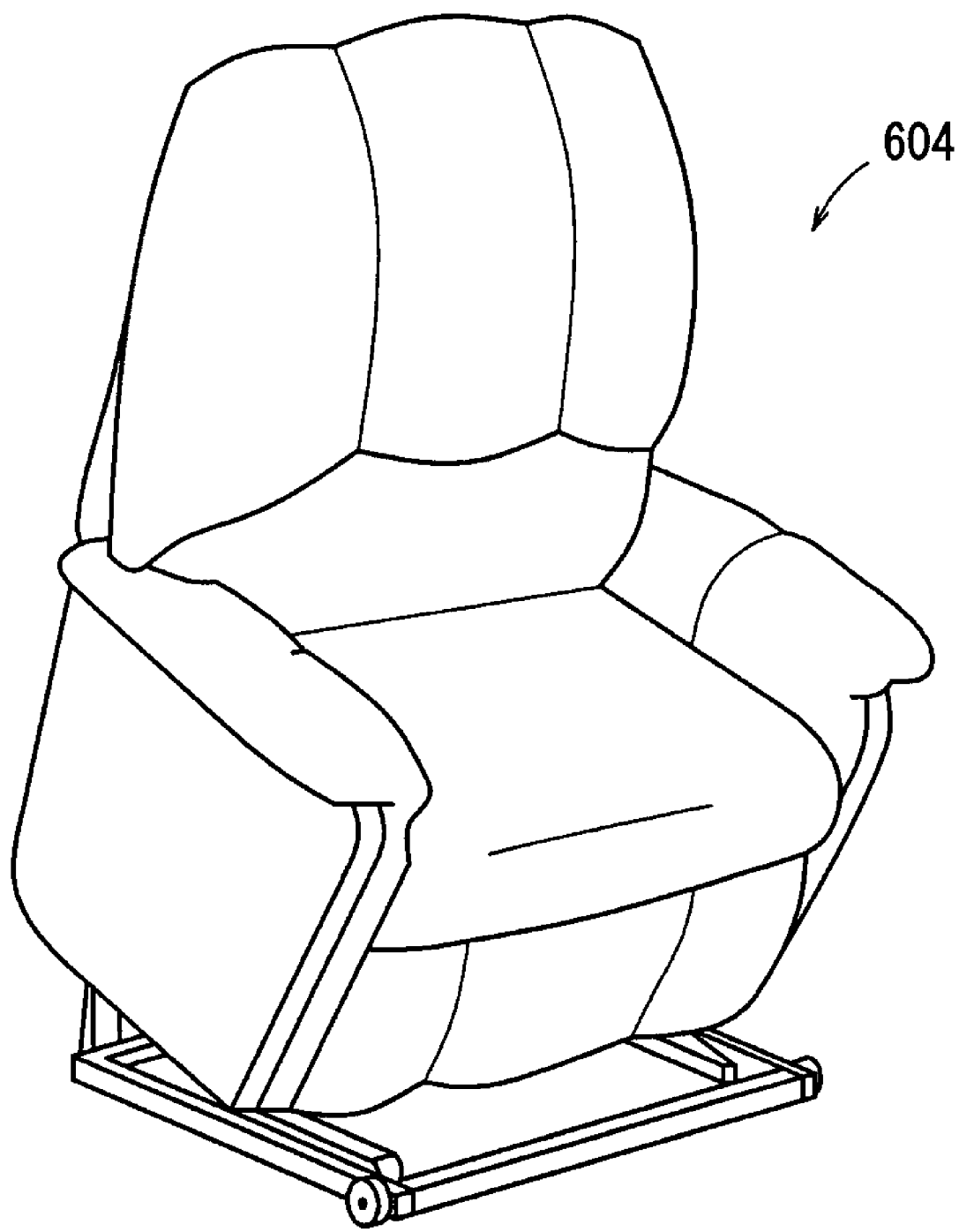
FIG. 32 is a perspective view illustrating an electric chair disclosed in a conventional technique, and to which the automatic speed reducing ratio-switching apparatus according to the embodiment of the present invention is applied.
Figure 33:
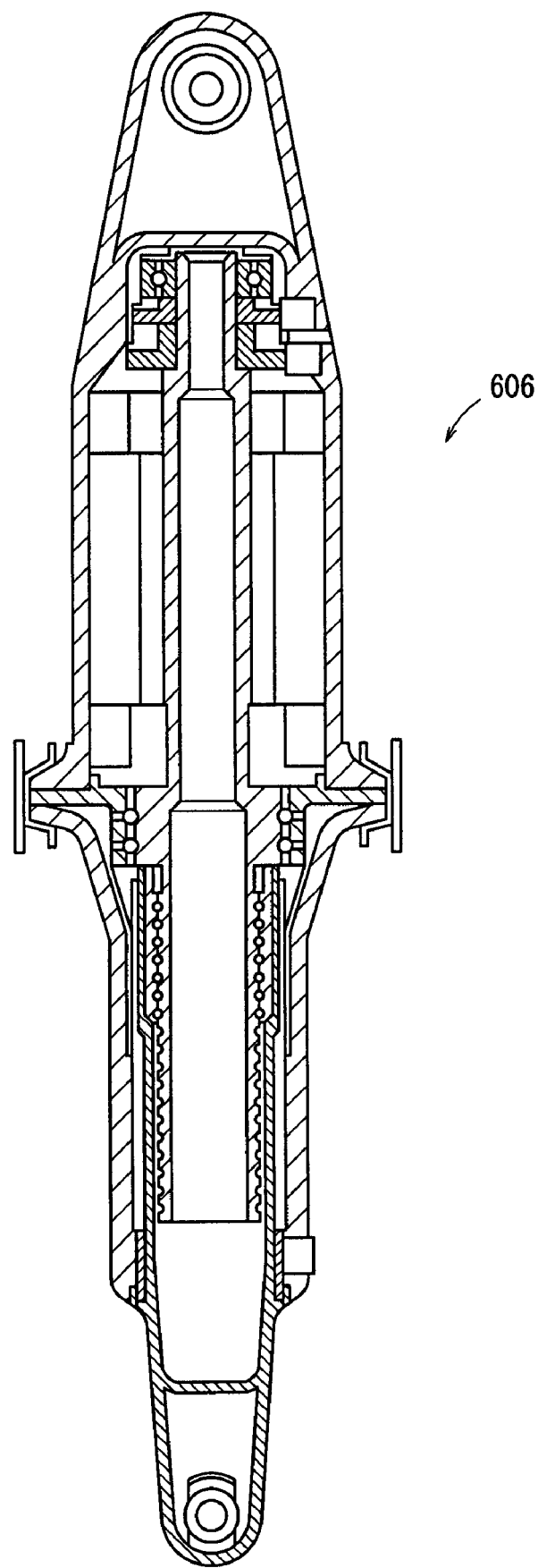
FIG. 33 is a vertical sectional view illustrating an electromechanical actuator disclosed in a conventional technique, and to which the automatic speed reducing ratio-switching apparatus according to the embodiment of the present invention is applied.
Figure 34:
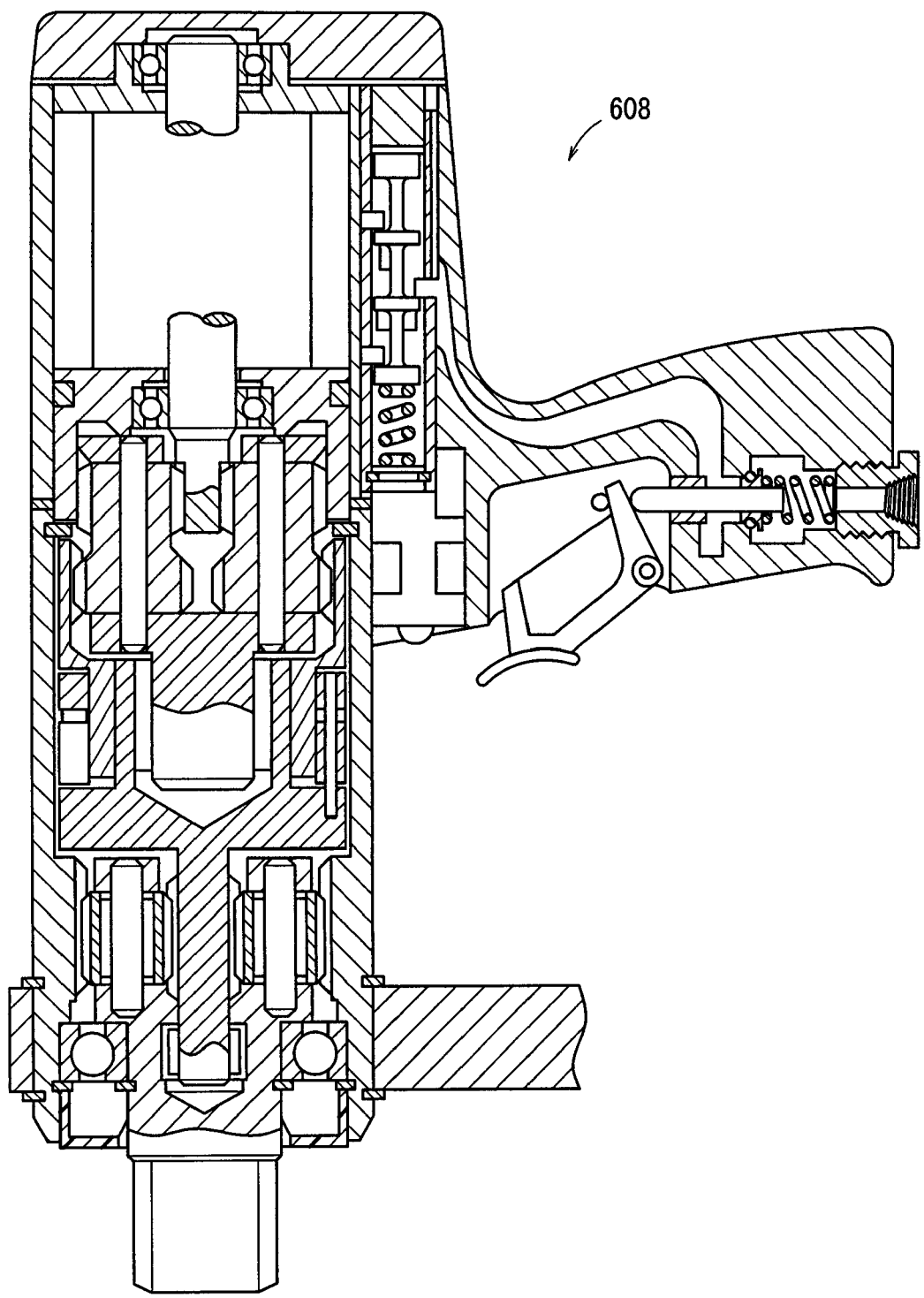
FIG. 34 is a vertical sectional view illustrating an electric fastener disclosed in a conventional technique, and to which the automatic speed reducing ratio-switching apparatus according to the embodiment of the present invention is applied.
Figure 35:
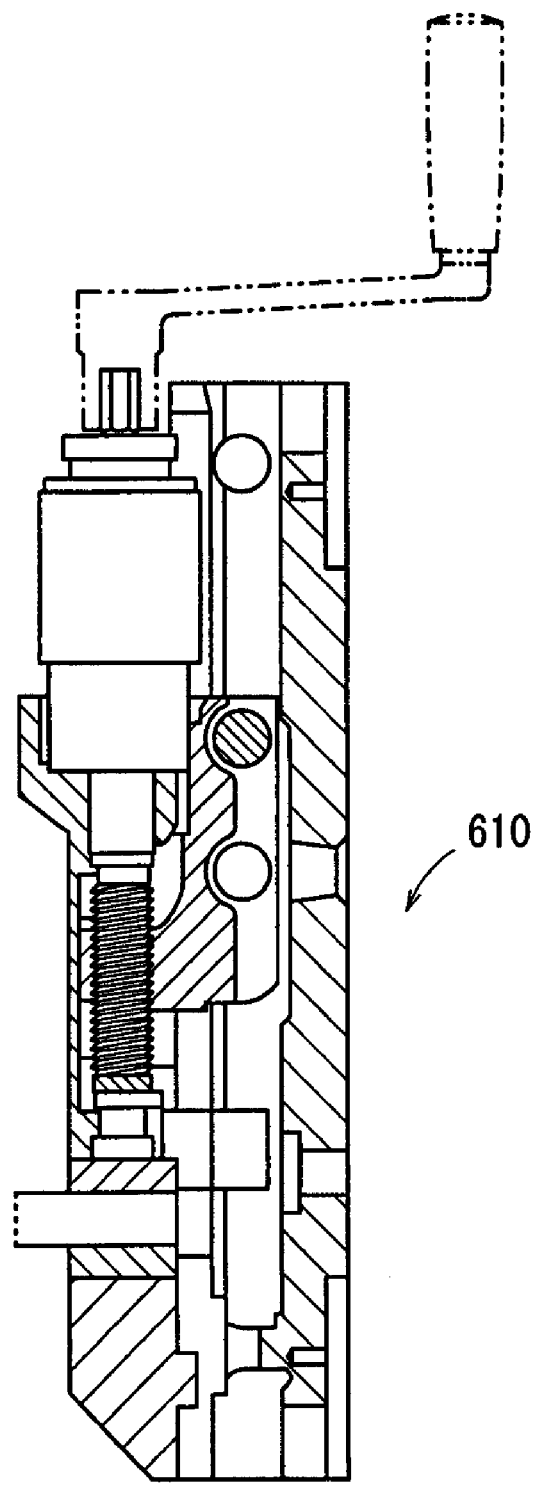
FIG. 35 is a vertical sectional view illustrating a clamp apparatus disclosed in a conventional technique, and to which the automatic speed reducing ratio-switching apparatus according to the embodiment of the present invention is applied.
Figure 36:
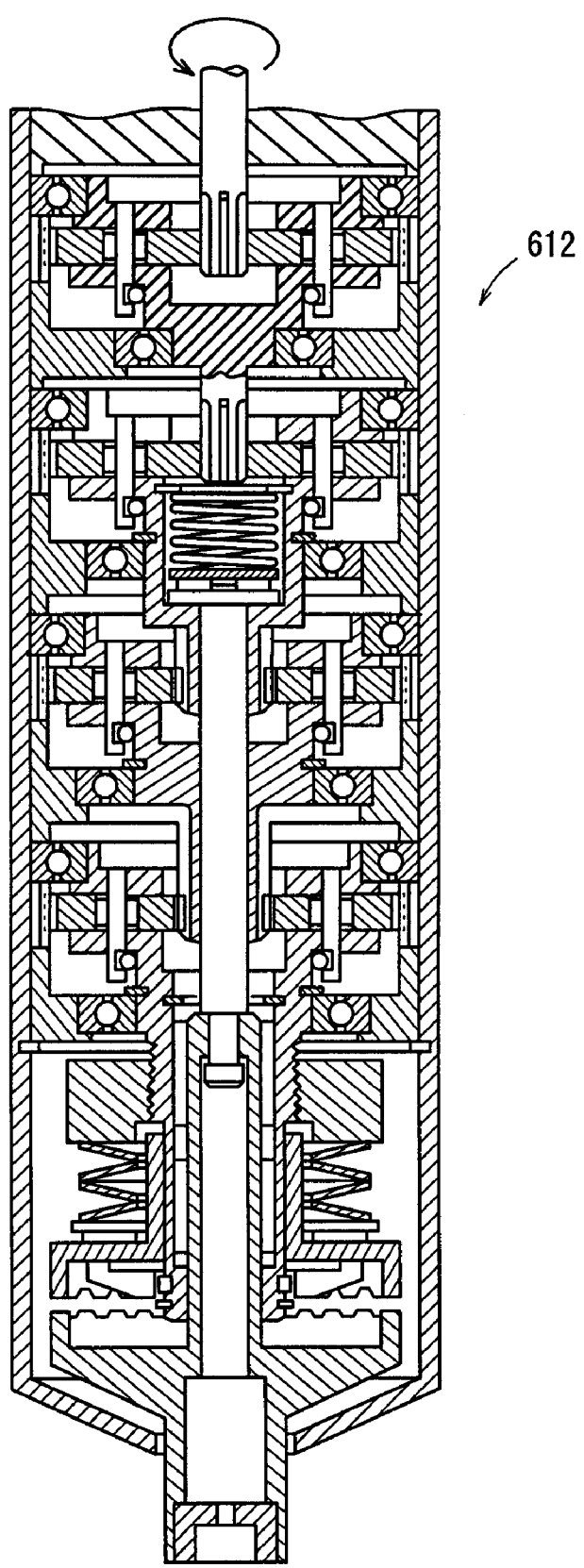
FIG. 36 is a vertical sectional view illustrating an automatic torque-switching apparatus disclosed in a conventional technique, and to which the automatic speed reducing ratio-switching apparatus according to the embodiment of the present invention is applied.
Figure 37:
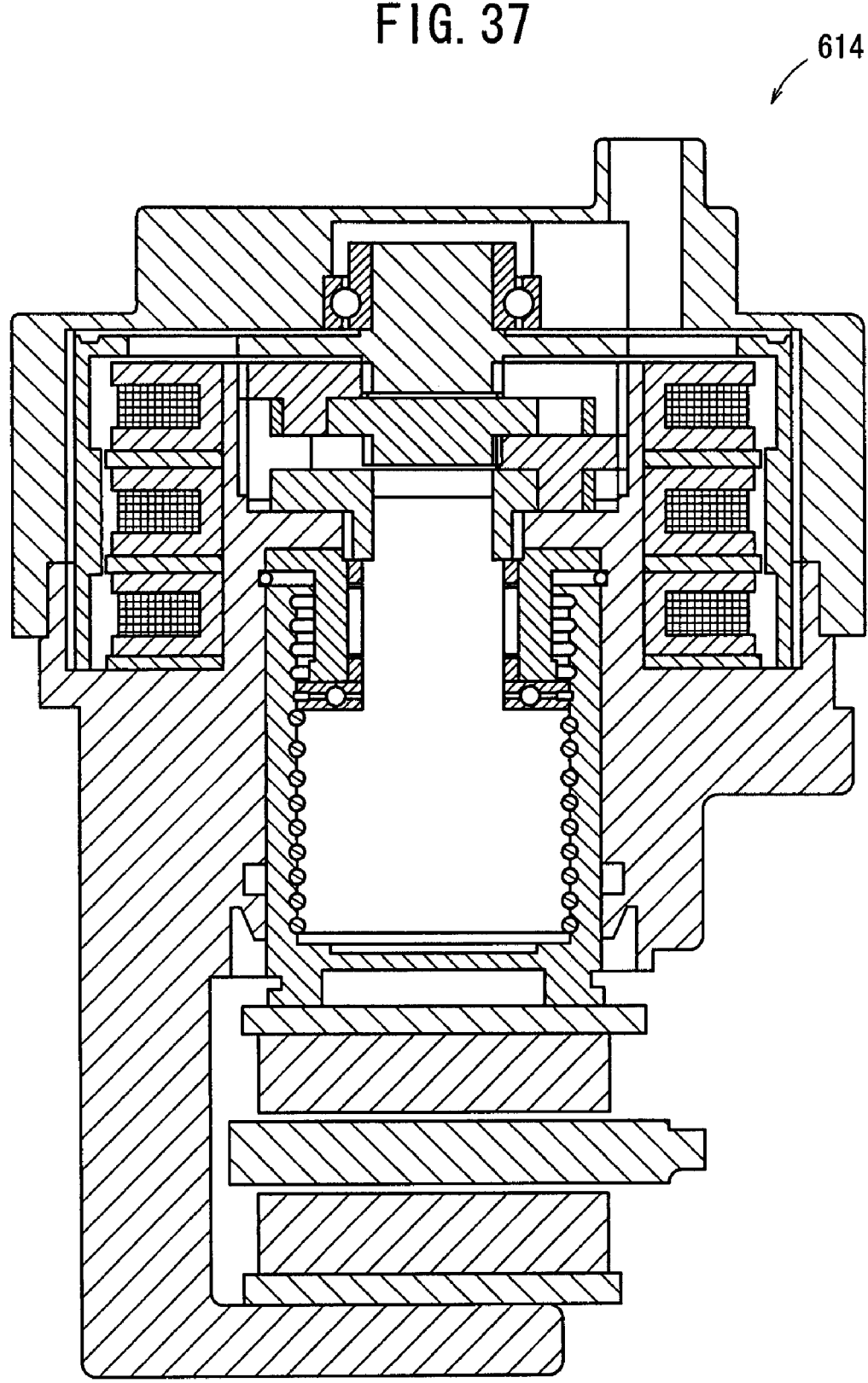
FIG. 37 is a vertical sectional view illustrating an electromechanical wheel brake apparatus disclosed in a conventional technique, and to which the automatic speed reducing ratio-switching apparatus according to the embodiment of the present invention is applied.
Figure 38:
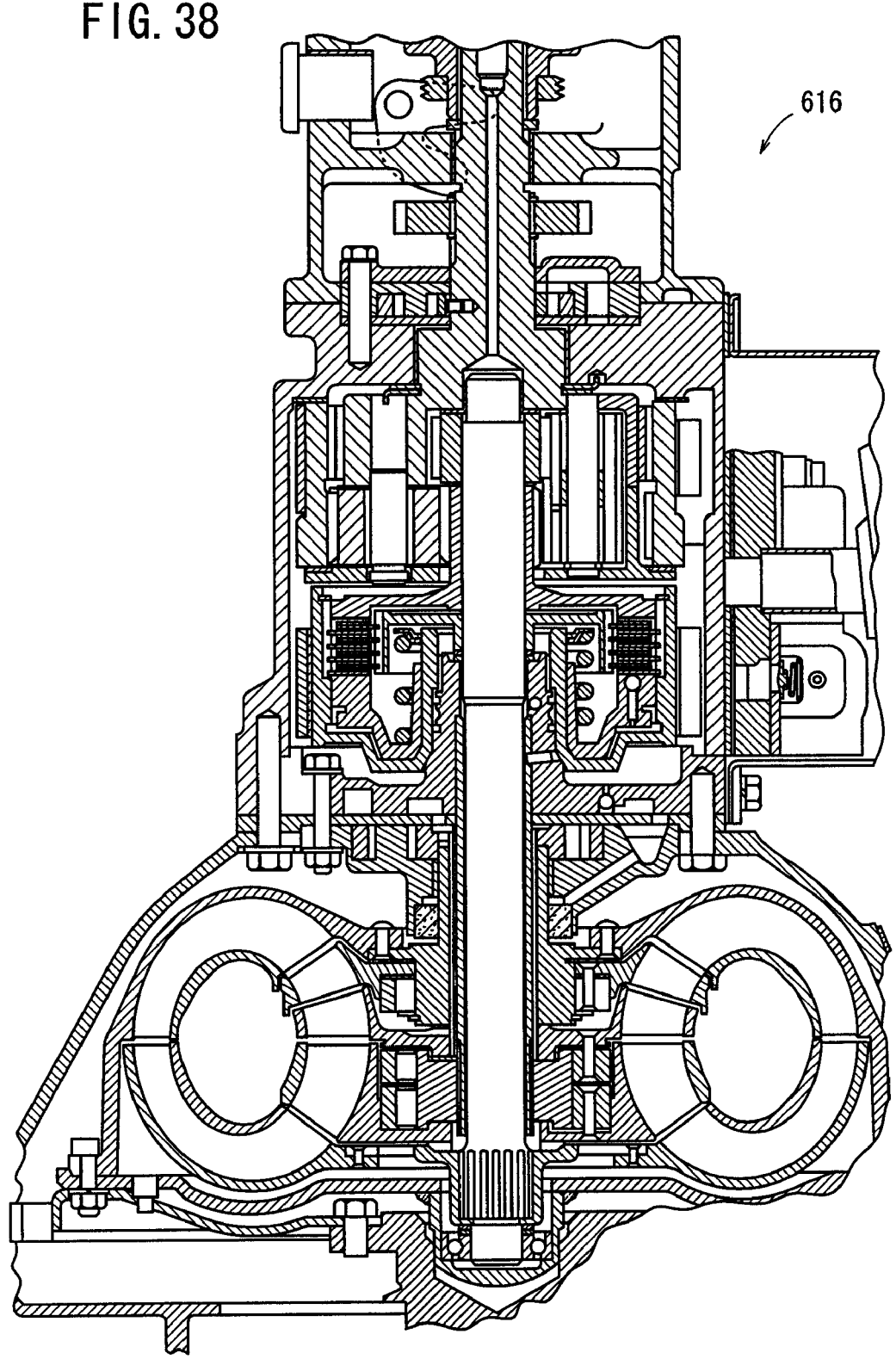
FIG. 38 is a vertical sectional view illustrating a torque-converting apparatus disclosed in a conventional technique, and to which the automatic speed reducing ratio-switching apparatus according to the embodiment of the present invention is applied.
Figure 39:
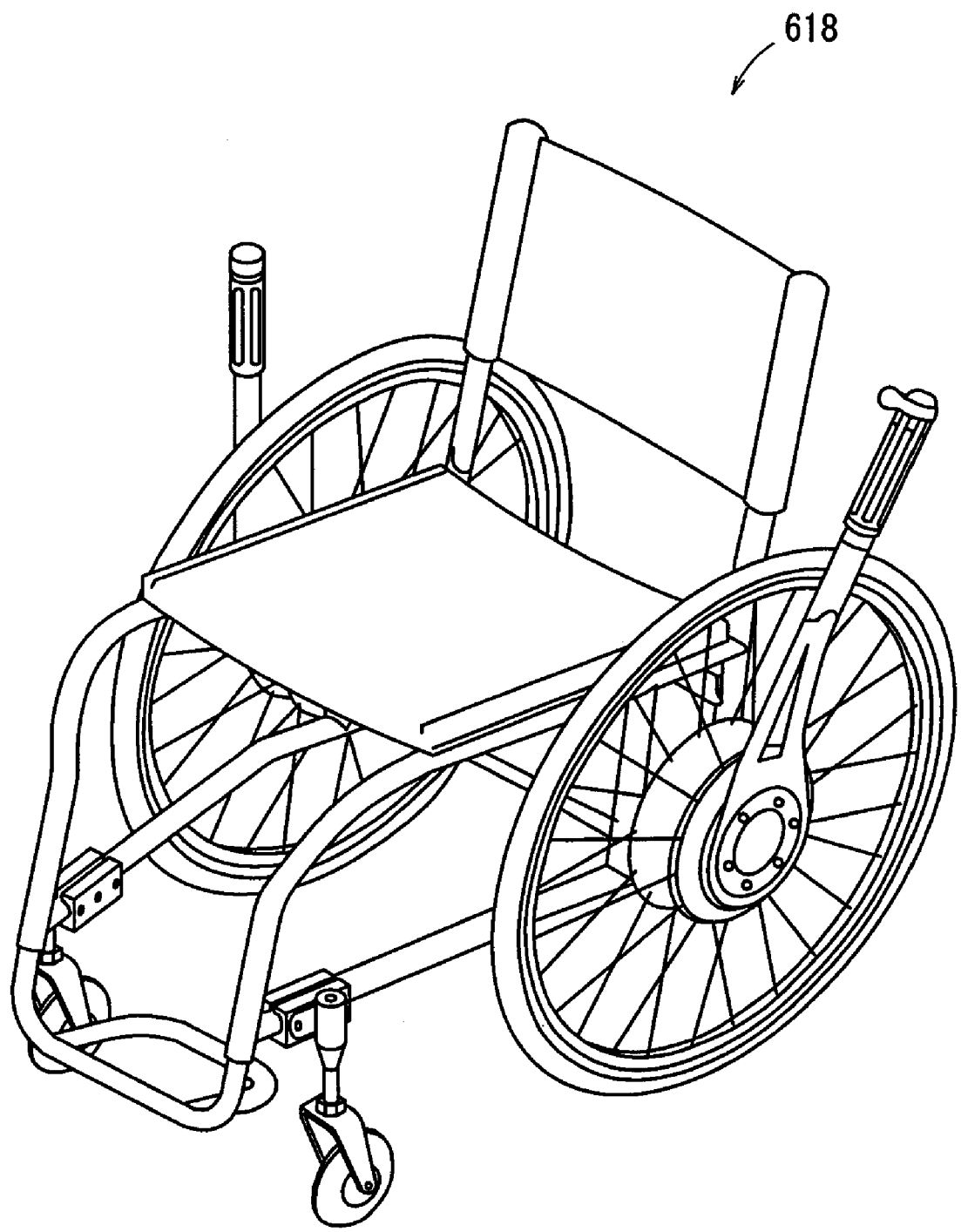
FIG. 39 is a perspective view illustrating an electric wheelchair disclosed in a conventional technique, and to which the automatic speed reducing ratio-switching apparatus according to the embodiment of the present invention is applied.

The automatic speed reducing ratio-switching apparatus 10 may appropriately be applied to the motor of a forward/backward movement mechanism 602, for driving a sliding door 600 of a vehicle, as disclosed in Japanese Laid-Open Patent Publication No. 2005-133379 (see FIG. 31), the motor of a linear actuator mechanism, for driving an electric chair 604, as disclosed in U.S. Pat. No. 5,730,494 (see FIG. 32), the motor of an electromechanical actuator 606 incorporated in an airplane, as disclosed in U.S. Pat. No. 5,041,748 (see FIG. 33), the motor or planet gear portions of an electric fastener 608, as disclosed in U.S. Pat. No. 5,730,232 (FIG. 34), the planet gear portion of a clamp apparatus 610, as disclosed in U.S. Pat. No. 5,813,666 (FIG. 35), the motor portion or one or more planet gear portions of an automatic speed torque switching apparatus 612, as disclosed in U.S. Pat. No. 4,869,139 (FIG. 36), the portion between the motor and screw of an electromechanical wheel brake apparatus 614, as disclosed in U.S. Pat. No. 6,806,602 (FIG. 37), the torque-converting apparatus 616 disclosed in U.S. Pat. No. 3,164,034 (FIG. 38), and the manual wheelchair 618 disclosed in U.S. Patent Publication No. 2004-104554 (FIG. 39), respectively.

Any one of the planet gear portion, the torque converter, and the fluid coupling portion of the torque-converting apparatus 616, as disclosed in U.S. Pat. No. 3,164,034, may be replaced with the automatic speed reducing ratio-switching apparatus 10 according to the embodiment of the present invention. Accordingly, it is possible to increase torque in binary directions of the planetary gear mechanism. Further, the planetary gear mechanism can be used as a fluid coupling having viscous coupling characteristics.

When the automatic speed reducing ratio-switching apparatus 10 according to the embodiment of the present invention is applied to the clutch and gear portions of the manual wheelchair 618 (FIG. 39) disclosed in U.S. Patent Publication No. 2004-104554, torque can be increased in forward and backward directions independently, for the left and right wheels respectively. When a step is encountered, it is possible to reduce the labor needed to drive the wheelchair by a handicapped person, or an elderly person.

Factors considered for integrally rotating the sun gear 36a, 36b, the planet gears 38a to 38h, and the ring gear 42a, 42b include (1) the clearance between the ring gear 42a, 42b and the planet gears 38a to 38h, (2) viscous resistances between the sun gear 36a, 36b, the planet gears 38a to 38h, and the ring gear 42a, 42b, and (3) frictional resistance between the planet gears 38a to 38h and the pins 48 that rotatably support the planet gears (the oil or grease is preferably silicone oil or silicone grease having an adjusted viscosity).

Further, in the case of the input side apparatus, which makes transmission to an output side mechanism by performing predetermined operations such as rotary motion or rectilinear motion on the basis of an input torque supplied from a rotary driving source such as a motor, excessive loads (forces) exerted from the input side, loads (gravity) due to vertical operation, and spring forces that accumulate energy, may be applied in some cases. When a reverse input torque is applied from the output side as described above, a reverse input-preventive clutch (see, for example, Japanese Laid-Open Patent Publication Nos. 2002-266902 and 64-69829) may appropriately be disposed between the rotary driving source and the input side apparatus, together with the automatic speed reducing ratio-switching apparatus 10 according to the embodiment of the present invention, which functions to prevent return to the input side by locking the reverse input torque from the output side.

When such a reverse input-preventive clutch is provided, then the input side apparatus is protected from excessive loads exerted on the input side in the power transmission system, so that the workpiece can be retained and locked when an input torque from the rotary driving source is stopped, for example. When the workpiece is moved upwardly or downwardly in the vertical direction, the workpiece can be reliably locked at the stopped position, whereby damage to the input side apparatus can be prevented.

Although certain preferred embodiments of the present invention have been shown and described in detail, it should be understood that various changes and modifications may be made therein without departing from the scope of the appended claims.

What is claimed is:

1. An automatic speed reducing ratio-switching apparatus arranged between a rotary driving source and a drive apparatus, for automatically switching a speed reducing ratio of a member, which is operated on the basis of a rotary driving force of said rotary driving source, said automatic speed reducing ratio-switching apparatus comprising:

a first planetary gear mechanism and a second planetary gear mechanism including a input shaft connected to said rotary driving source, an output shaft connected to said driven apparatus, an input side sun gear and an output side sun gear, input side planet gears and output side planet gears, an input side ring gear and an output side ring gear, which are meshed with said input side planet gears and said output side planet gears respectively, and an input side carrier, an output side carrier and an intermediate carrier, which rotatably support said input side planet gears and said output side planet gears and which are rotated integrally in accordance with revolution of said input side planet gears and said output side planet gears, said first planetary gear mechanism and said second planetary gear mechanism being juxtaposed in an axial direction of said input shaft;

a first inner clutch member and a second inner clutch member, each of which enables rotation in one direction while locking rotation in the other direction of said input shaft, and which have mutually different locking directions;

a first outer clutch member and a second outer clutch member, each of which enables rotation in one direction while locking rotation in the other direction of said input side ring gear or said output side ring gear, and which have mutually different locking directions; and a viscous resistance member, which functions based on action of a static frictional force, so that said input side sun gear, said input side planet gears, and said input side ring gear are integrally rotated respectively in an identical direction, or so that said output side sun gear, said output side planet gears, and said output side ring gear are integrally rotated respectively in an identical direction.

2. The automatic speed reducing ratio-switching apparatus according to claim 1, wherein said intermediate carrier is disposed between said input side carrier and said output side carrier, and said input side carrier, said output side carrier, and said intermediate carrier are rotatable in an integrated manner by pins which rotatably support said planet gears.

3. The automatic speed reducing ratio-switching apparatus according to claim 1, wherein said first planetary gear mechanism and said second planetary gear mechanism are juxtaposed in said axial direction inside of a tightly sealed chamber of a housing, which is constructed by two divided parts.

4. The automatic speed reducing ratio-switching apparatus according to claim 3, wherein said housing comprises a pair of expanded sections, which have circular arc-shaped cross sections and which protrude in a diametrical direction from an outer circumferential surface thereof, and wherein attachment holes, which penetrate in said axial direction, are formed through said expanded sections.

5. The automatic speed reducing ratio-switching apparatus according to claim 1, wherein a first seal member, which is composed of a ring member having an X-shaped cross section surrounding an outer circumferential surface of said input shaft, is disposed in a central hole of said input side carrier.

6. The automatic speed reducing ratio-switching apparatus according to claim 1, wherein a second seal member, which is composed of a ring member having an X-shaped cross section in contact with an inner circumferential surface of said input side ring gear thereby providing a sealing function, is disposed on an outer circumferential portion of said input side carrier.

7. The automatic speed reducing ratio-switching apparatus according to claim 1, wherein said output side carrier comprises a disk section, said output shaft being formed integrally at a central portion of said disk section.

8. The automatic speed reducing ratio-switching apparatus according to claim 7, wherein a third seal member, which is composed of a ring member having an X-shaped cross section in contact with an inner circumferential surface of said output side ring gear thereby providing a sealing function, is disposed on an outer circumferential portion of said disk section.

9. The automatic speed reducing ratio-switching apparatus according to claim 1, wherein said intermediate carrier is interposed between said input side carrier and said output side carrier, and said input side carrier, said output side carrier, and said intermediate carrier extend substantially in parallel to one another.

10. The automatic speed reducing ratio-switching apparatus according to claim 1, wherein a fourth seal member, which is composed of a ring member in contact with inner walls of said input side ring gear and said output side ring gear respectively, thereby providing a sealing function, is disposed on an outer circumferential portion of said intermediate carrier.

11. The automatic speed reducing ratio-switching apparatus according to claim 1, wherein said input side planet gears are disposed on one side surface of said intermediate carrier, said output side planet gears are disposed on the other side surface of said intermediate carrier on a side opposite to said one side surface, and phases are deviated by 45 degrees, respectively, in a circumferential direction between said input side planet gears and said output side planet gears.

* * * * *